United States Patent
Hayakawa et al.

(10) Patent No.: US 10,650,534 B2
(45) Date of Patent: May 12, 2020

(54) DISPLAY CONTROL AND IMAGE PROCESSING OF A CELL IMAGE

(71) Applicant: Sony Corporation, Tokyo (JP)

(72) Inventors: Tomohiro Hayakawa, Saitama (JP); Takeshi Kunihiro, Kanagawa (JP); Eriko Matsui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/391,157

(22) Filed: Apr. 22, 2019

(65) Prior Publication Data

US 2019/0311483 A1 Oct. 10, 2019

Related U.S. Application Data

(63) Continuation of application No. 13/984,672, filed as application No. PCT/JP2012/054857 on Feb. 28, 2012, now Pat. No. 10,311,581.

(30) Foreign Application Priority Data

Feb. 28, 2011 (JP) .................................. 2011-043330
Jul. 25, 2011 (JP) .................................. 2011-162640

(51) Int. Cl.
*G06T 7/215* (2017.01)
*G06T 7/00* (2017.01)
(Continued)

(52) U.S. Cl.
CPC .............. *G06T 7/215* (2017.01); *G01B 11/00* (2013.01); *G06T 7/0016* (2013.01); *G06T 2207/30024* (2013.01)

(58) Field of Classification Search
None
See application file for complete search history.

(56) References Cited

U.S. PATENT DOCUMENTS 9,786,052 B2  10/2017  Kunihiro et al.
9,851,894 B2  12/2017  Ogata
(Continued)

FOREIGN PATENT DOCUMENTS

CN  101404941 A  4/2009
CN  101903532 A  12/2010
(Continued)

OTHER PUBLICATIONS

International Search Report and Written Opinion and English Translation thereof dated Apr. 10, 2012 in connection with Application No. PCT/JP2012/054857.

(Continued)

*Primary Examiner* — Michael J Cobb
(74) *Attorney, Agent, or Firm* — Wolf, Greenfield & Sacks, P.C.

(57) ABSTRACT

The present technology relates to a display control apparatus and a method, an image processing apparatus and a method, and a program that enable easy and noninvasive observation of an object to be observed. A first display control unit configured to perform display control of a cell image with one or a plurality of images including cells, and a second display control unit configured to perform display control such that a part or all of a motion amount generated for each of subregions with the one or the plurality of images is associated with each of the subregions, and is superimposed on the cell image and is displayed, are provided. The present disclosure can be applied to a display control apparatus or an image processing apparatus.

11 Claims, 21 Drawing Sheets

(51) Int. Cl.
   *G01B 11/00*  (2006.01)
   *G01N 33/50*  (2006.01)
   *H04N 5/14*  (2006.01)

(56) References Cited

U.S. PATENT DOCUMENTS

| | | | |
|---|---|---|---|
| 10,311,581 B2* | 6/2019 | Hayakawa | G01B 11/00 |
| 10,311,582 B2 | 6/2019 | Kunihiro et al. | |
| 2001/0017937 A1 | 8/2001 | Bonnefous | |
| 2002/0072113 A1 | 6/2002 | Barbera-Guillem et al. | |
| 2005/0203708 A1 | 9/2005 | Ghosh | |
| 2006/0034545 A1 | 2/2006 | Mattes et al. | |
| 2008/0304732 A1 | 12/2008 | Rittscher et al. | |
| 2009/0067699 A1 | 3/2009 | Clark | |
| 2010/0056919 A1 | 3/2010 | Abe | |
| 2010/0104203 A1 | 4/2010 | Garakani et al. | |
| 2011/0013821 A1 | 1/2011 | Mimura et al. | |
| 2011/0019923 A1 | 1/2011 | Mimura et al. | |
| 2011/0075904 A1 | 3/2011 | Yoshikawa et al. | |
| 2011/0097799 A1 | 4/2011 | Stankewicz et al. | |
| 2012/0236027 A1 | 9/2012 | Ogata | |
| 2013/0070971 A1 | 3/2013 | Kunihiro et al. | |
| 2013/0222421 A1 | 8/2013 | Otsuka | |
| 2013/0321459 A1 | 12/2013 | Hayakawa et al. | |
| 2016/0232682 A1 | 8/2016 | Nakagawa et al. | |
| 2017/0337697 A1 | 11/2017 | Kunihiro et al. | |

FOREIGN PATENT DOCUMENTS

| | | |
|---|---|---|
| EP | 1 728 856 A1 | 12/2006 |
| EP | 2 270 198 A1 | 1/2011 |
| JP | 63-233392 A2 | 9/1988 |
| JP | 2004-178369 A | 6/2004 |
| JP | 2007-121106 | 5/2007 |
| JP | 2007-222073 A | 9/2007 |
| JP | 2009-229274 A | 10/2009 |
| JP | 2010-026392 | 2/2010 |
| JP | 2010-119314 A | 6/2010 |
| JP | 2010-130966 A | 6/2010 |
| JP | 2010-169823 A | 8/2010 |
| JP | 2010-187925 A | 9/2010 |
| JP | 2010-538603 A | 12/2010 |
| WO | WO 2007/107925 A1 | 9/2007 |
| WO | WO 2008/149055 A1 | 12/2008 |
| WO | WO 2008/149976 A1 | 12/2008 |
| WO | WO 2008/152983 A1 | 12/2008 |
| WO | WO 2009/119330 A1 | 10/2009 |
| WO | WO 2011/122200 A1 | 10/2011 |

OTHER PUBLICATIONS

International Preliminary Report on Patentability and English Translation thereof dated Sep. 12, 2013 in connection with Application No. PCT/JP2012/054857.
Chinese Office Action dated Mar. 25, 2014 in connection with Chinese Application No. 2012-80009893.5.
Japanese Office Action dated Aug. 3, 2015 in connection with Japanese Application No. 2011-162640, and English translation thereof issued Aug. 8, 2015.
Japanese Office Action and English translation thereof dated Dec. 8, 2015 in connection with Japanese Application No. 2011-162640.
Japanese Office Action dated Jul. 5, 2016 in connection with Japanese Application No. 2011-162640, and English translation thereof.
Partial Supplementary European Search Report dated Oct. 4, 2016 in connection with European Application No. 12752715.8.
Japanese Office Action dated Nov. 17, 2016 in connection with Japanese Application No. 2011-162640, and English translation thereof.
Extended European Search Report dated Mar. 15, 2017 in connection with European Application No. 12752715.8.
Korean Office Action dated Dec. 16, 2017 in connection with Korean Application No. 10-2013-7021429, and English translation thereof.
Chinese Office Action dated Jun. 4, 2018 in connection with Chinese Application No. 2016101588467, and English translation thereof.
European Communication Pursuant to Article 94(3) EPC dated Apr. 24, 2019 in connection with European Application No. 12 752 715.8.
[No Author Listed], List of papers—Miaab 2007. Retrieved from the Internet on Apr. 11, 2019: https://web.archive.org/web/20080922045855/http://www.miaab.org/miaab-2007-papers.html. 1 page.
[No Author Listed], File properties of D1. Retrieved on Apr. 11, 2019. 1 page.
Genovesio et al., Multiple particle tracking in 3-D+t microscopy: Method and application to the tracking of endocytosed quantum dots. 2006, IEEE Transactions on Image Processing, 15(5): 1062-1070.
Hayakawa et al., Noninvasive evaluation of contractile behavior of cardiomyocyte monolayers based on motion vector analysis. Tissue Engineering: Part C; v18(1); 2012. pp. 21-32.
Hu et al., Differential transmission of actin motion within focal adhesions. Science. Jan. 5, 2007; 315(5808): 111-115.
Kamgoué et al., Quantification of cardiomyocyte contraction based on image correlation analysis. 2009, Cytometry Part A, 75A: 298-308.
Kanade et al., Cell image analysis: Algorithms, system and applications. 2011, IEEE Workshop on Applications of Computer Vision. pp. 374-381.
Kunihiro et al., Discussion on Pulsation Evaluation Method of Cultured Myocardial Cells by Moving Images Analysis, Regenerative Medicine. Feb. 1, 2011; 10(40): 144.
Li et al., Cell population tracking and lineage construction with spatiotemporal context. 2008, Medical Image Analysis, 12(5): 546-566.
Maskarinec et al., Quantifying cellular traction forces in three dimensions. 2009, Proc Natl Acad Sci USA, 106(52): 22108-22113.
Mathew, Cells in the heart dance to the tune of light. 2008, Optics & Photonics Focus, vol. 2 Story 2, pp. 1-2.
Petitjean et al., Velocity fields in a collectively migrating epithelium. Biophysical J. 98(9), May 1, 2010. pp. 1790-1800.
Sebastian et al., Automatic Characterization of in vitro cardiomyocyte motion. $2^{nd}$ Int. Workshop Microscop. Imag. Anal. Appl. in Biol., Jan. 1, 2007; Retrieved from the Internet: http://www.miaab.org/miaab-2007-papers/miaab-2007-10-sebastian.pdf. 5 pages.
Shapira-Schweitzer et al., Matrix stiffness affects spontaneous contraction of cardiomyocytes cultured within a PEGylated fibrinogen biomaterial. Acta Biomaterialia, Elsevier, Amsterdam, NL, vol. 3(1); Nov. 29, 2006; pp. 33-41.
Tracqui et al., Theoretical analysis of the adaptive contractile behavior of a single cardiomyocyte cultured on elastic substrates with varying stiffness. 2008, Journal of Theoretical Biology, pp. 92-105.

* cited by examiner

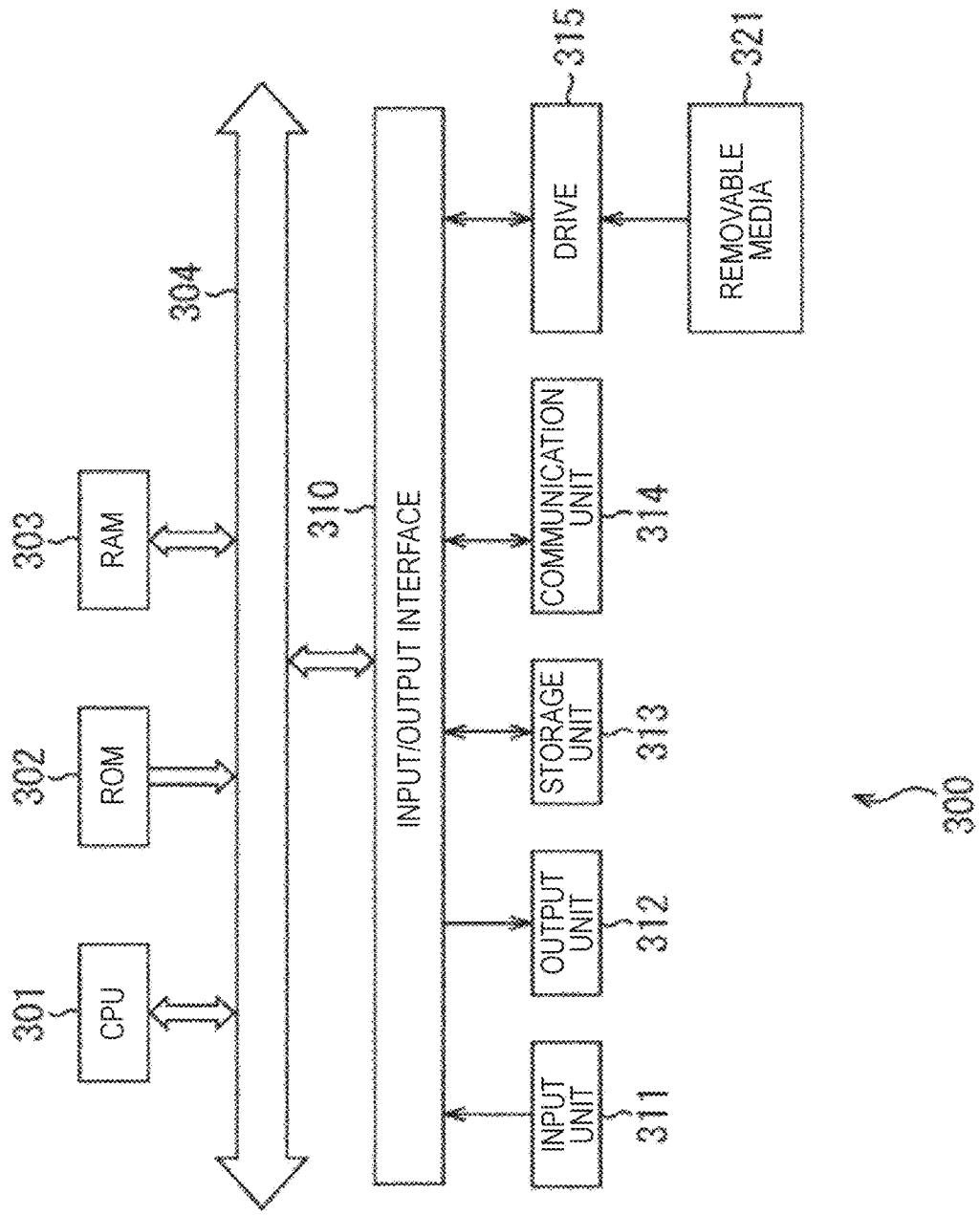

DISPLAY CONTROL AND IMAGE PROCESSING OF A CELL IMAGE

CROSS REFERENCE TO RELATED APPLICATIONS

The present application is a continuation of and claims the benefit under 35 U.S.C. § 120 of U.S. patent application Ser. No. 13/984,672, now U.S. Pat. No. 10,311,581, titled "DISPLAY CONTROL AND IMAGE PROCESSING OF A CELL IMAGE," filed Aug. 9, 2013, which is hereby incorporated by reference in its entirety. Application Ser. No. 13/984,672 is a national stage entry filed under 35 U.S.C. § 371 of PCT Application No. PCT/JP2012/054857, filed Feb. 28, 2012, which claims priority to Japanese Patent Applications JP 2011-162640, filed Jul. 25, 2011, and JP 2011-043330, filed Feb. 28, 2011.

TECHNICAL FIELD

The present disclosure relates to a display control apparatus and a method, an image processing apparatus and a method, and a program, and especially relates to a display control apparatus and a method, an image processing apparatus and a method, and a program that enables easy and noninvasive observation of propagation of pulsation.

BACKGROUND ART

In the field of regenerative medicine, regeneration of cells, tissues, organs, and the like of a body that are lost due to accidents, disease, and the like, and restoration of functions have been achieved using cultured cells manufactured by culturing cells. Cell tissues that can be manufactured as such cultured cells have a wide variety. An example of the cultured cells includes cardiomyocytes, and the cardiomyocytes are used for heart treatment. Cultured cardiomyocytes themselves have motions corresponding to pulsation. Therefore, in a manufacturing stage of cultured cardiomyocytes, it is necessary to perform quality evaluation of whether the motions are favorable, for example.

In performing such quality evaluation of the cultured cardiomyocytes, visual observation is, for example, performed in current situations. Further, measuring a potential by piercing cultured cardiomyocytes with an electrode has been performed. However, the visual observation is significantly dependent on an observer's subjective view, and it is difficult to obtain an objective and accurate evaluation result. Further, in the case of measuring a potential, the cultured cardiomyocytes come into contact with the electrode, and thus there is a problem that the measurement is not noninvasive. In addition, information that may be quantified on the basis of the measurement of the potential is limited to a pulsation time, and the like. Furthermore, an object to be measured is limited to be placed on an electrode.

Therefore, as a past technology, a configuration is known in which measurement points are set in an imaged screen obtained by photographing a cardiomyocyte, the luminance of the measurement points is automatically measured, and the deformation period of the cardiomyocyte is measured from the measured values (for example, see Patent Document 1).

By the way, pulsation in various regions obtained by an analysis of a phase difference observation moving image of the cultured cardiomyocytes shows cooperative pulsation in a culture duration-related manner. However, the pulsation shows a fluctuation due to administration of various drugs. By detecting such a fluctuation in some way, the drug toxicity, the influence, and the like in drug development can be evaluated in advance, and this has received attention in recent years.

In the past, for example, there has been a method in which an external field potential of cells is detected by an electrode disposed on a bottom of a culture dish, and the pulsation behavior of the cells is captured by a membrane potential change of the cells. Also, there has been a method in which a fluorescent dye, which attaches to calcium and emits light, is put into the cells, and the calcium concentration that fluctuates according to the excitement of the cells (action potential) is detected, so that pulsation rhythm of the cells is detected and an information propagation pattern of the cells is evaluated.

CITATION LIST

Patent Document

Patent Document 1: Japanese Patent Application Laid-Open No. 63-233392 (FIG. 1)

SUMMARY OF THE INVENTION

Problems to be Solved by the Invention

However, in the case of arranging an electrode in a culture dish and detecting a change of a potential, a special culture dish is required. Also, detection of the propagation of pulsation depends on the density of the electrode disposed on the culture dish. Therefore, detection of complicated propagation patterns is difficult with the density of existing devices. Also, in the case of putting a fluorescent dye, the fluorescent dye is expensive, the work of putting the fluorescent dye is complicated and takes a time, and discoloration may be caused. Further, in these techniques, a voltage is applied to an object to be observed, and a fluorescent dye is put in. Therefore, there is a possibility of influencing the object to be observed. That is, these techniques may not easily and noninvasively conduct the observation of propagation of pulsation.

The present disclosure has been made in view of the foregoing, and an objective of the present disclosure is to enable easy and noninvasive observation of propagation of pulsation.

Solutions to Problems

According to one aspect of the present disclosure, there is provided a display control apparatus including: a first display control unit configured to perform display control of a cell image with one or a plurality of images including cells; and a second display control unit configured to perform display control such that a part or all of a motion amount generated for each of subregions with the one or the plurality of images is associated with each of the subregions, and is superimposed on the cell image and displayed.

The cells are cells passively or actively moving, and the second display control unit may display a part or all of the motion amount to express a state of propagation of a motion of the cells.

The second display control unit may display the state of propagation of a motion of the cells as a time-dependent change of a distribution of the motion amount in the cell image.

The second display control unit may express the time-dependent change of a distribution of the motion amount by displaying, for each of a plurality of times of day, a two-dimensional map on a curved surface or on a plane, the two-dimensional map expressing the distribution of the motion amount.

The second display control unit may express a position of the motion amount in the cell image as a position on the two-dimensional map, and express an absolute value of the motion amount in color, density, or pattern.

The cell image is a moving image, and the second display control unit may superimpose, on each of frame images of the cell image, a part or all of the motion amount corresponding to the frame image, and display a superimposed image.

The second display control unit may display an evaluation result of a distribution of the motion amount along with the motion amount.

According to one aspect of the present disclosure, there is provided a display control method of a display control apparatus, the method including the steps of: performing display control of a cell image with one or a plurality of images including cells by a first display control unit; and performing display control by a second display control unit such that a part or all of a motion amount generated for each of subregions with the one or the plurality of images is associated with each of the subregions, and are superimposed on the cell image and displayed.

Further, according to one aspect of the present disclosure, there is provided a program causing a computer to function as: a first display control unit configured to perform display control of a cell image with one or a plurality of images including cells; a second display control unit configured to perform display control such that a part or all of a motion amount generated for each of subregions with the one or the plurality of images is associated with each of the subregions, and are superimposed on the cell image and displayed.

According to another aspect of the present disclosure, there is provided an image processing apparatus including: a motion amount generation unit configured to generate a motion amount of one or a plurality of images including cells for each subregion; and an evaluation unit configured to evaluate a state of propagation of a motion of the cells using a part or all of the motion amount generated by the motion amount generation unit.

The evaluation unit may display, as an image, a comparison result of the state of propagation of a motion of the cells indicated by the motion amount with a case where it is certain that the motion of the cells is normal.

The evaluation unit may quantitatively evaluate a change of the state of propagation of a motion of the cells by obtaining a difference of the motion amount of the cell image with the case where it is certain that the motion of the cells is normal, and by evaluating the difference.

The evaluation unit may evaluate a change of a motionless region that does not have a motion in the cell image.

The evaluation unit may evaluate a change of a speed of displacement of a region where the motion amount is large.

The evaluation unit may evaluate a change of a locus of a center of gravity of the motion amount.

The evaluation unit may evaluate a histogram regarding a speed and a direction of a motion of the cell image.

The evaluation unit may evaluate the state of propagation of a motion of the cells during an observation period of a few hours to a few days.

The evaluation unit may evaluate the state of propagation of a motion of the cells so as to detect occurrence of an irregular pulse of cardiomyocytes regardless of occurrence of QT prolongation that is prolongation of time between Q wave and T wave of the cardiomyocytes.

Further, according to another aspect of the present disclosure, there is provided an image processing method of an image processing apparatus, the method including the steps of: generating a motion amount of one or a plurality of images including cells for each subregion by a motion amount generation unit; and evaluating a state of propagation of a motion of the cells by an evaluation unit using a part or all of the generated motion amount.

Further, according to another aspect of the present disclosure, there is provided a program causing a computer to function as: a motion amount generation unit configured to generate a motion amount of one or a plurality of images including cells for each subregion; and an evaluation unit configured to evaluate a state of propagation of a motion of the cells using a part or all of the motion amount generated by the motion amount generation unit.

In one aspect of the present disclosure, display control of a cell image is performed with one or a plurality of images including cells such that a part or all of a motion amount generated for each subregion with the one or the plurality of images is associated with the subregion, and is superimposed on the cell image and displayed.

In another aspect of the present disclosure, a motion amount is generated for each subregion with respect to one or a plurality of images including cells, and a state of propagation of a motion of cells is evaluated using a part or all of the generated motion amount.

Effects of the Invention

According to the present disclosure, an image can be processed. Especially, propagation of pulsation can be easily and noninvasively observed.

BRIEF DESCRIPTION OF DRAWINGS

FIG. 22 is a block diagram illustrating a main configuration example of a personal computer.

MODE FOR CARRYING OUT THE INVENTION

Hereinafter, an embodiment for implementing the present disclosure (hereinafter, referred to as an embodiment) will be described. Description will be given in the following order.
1. First Embodiment (Drug Evaluation Apparatus)
2. Second Embodiment (Personal Computer)

1. First Embodiment

[Cultured Cardiomyocytes]

In regenerative medicine, for example, various tissues and organs of human bodies have been treated using cultured cells that are cell tissues manufactured by culturing cells collected from living bodies. Cultured cells 1 illustrated in FIG. 1A are ones obtained by culturing and raising cardiomyocytes. Cultured cardiomyocytes that are cultured cells obtained by culturing cardiomyocytes may be used for heart treatment, and the like, for example. Also, the cultured cardiomyocytes may be used for toxicity evaluation for hearts in drug development.

In a living body, the cardiomyocytes continuously pulse while repeating contraction and relaxation. Therefore, in the cultured cells 1 that are the cultured cardiomyocytes, cells in each portion move in a predetermined direction like a motion vector 2 illustrated in FIG. 1B so that the whole cells repeat contraction and relaxation. In reality, the cardiomyocytes have an autonomously pulsing portion and a portion that pulses depending on surrounding pulsation. That is, there may be a case where the cultured cells 1 do not autonomously pulse, depending on a region. In such a case, the cultured cells 1 may pulse by periodically applying a voltage thereto from an outside using an electrode. The pulsation of the cultured cells 1 subjected to pace making by the voltage application from an outside in this way is basically similar to the autonomous pulsation. That is, the case where the cultured cells 1 autonomously pulse and the case where the cultured cells 1 pulse by the voltage application are similarly observed using the present technology.

FIG. 1C illustrates a situation where an observation region of the cultured cells 1 is divided into a plurality of subregions (blocks), a motion amount (motion vector) is observed for each block, and a time shift thereof is observed. For example, a graph 4-1 of FIG. 1C illustrates the time shift of the motion amount of a block 3-1, and a graph 4-2 illustrates the time shift of the motion amount of a block 3-2.

Figure 2:
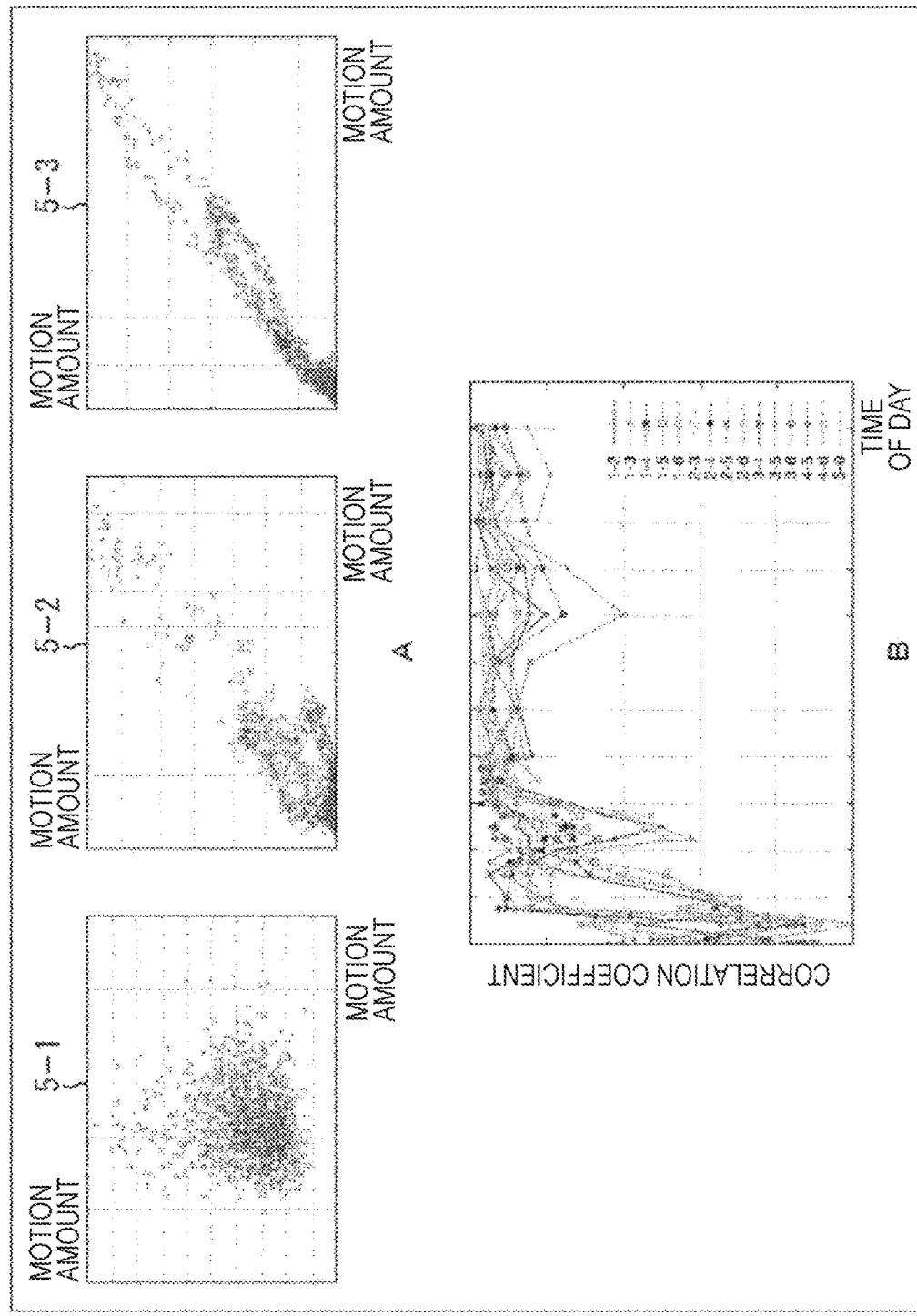
FIG. 2 is a diagram describing cooperativity of motions.

Graphs 5-1 to 5-3 of FIG. 2A illustrate the time shift of a relationship between the motion amount of the cells of the block 3-1 illustrated in the graph 4-1 and the motion amount of the cells of the block 3-2 illustrated in the graph 4-2.

In the beginning when the cells are collected from a living body, the motion amount of the cells existing in the block 3-1 and the motion amount of the cells existing in the block 3-2 have poor correlation as illustrated in the graph 5-1. However, as time passes and culturing proceeds, both sides are gradually correlated as illustrated in the graph 5-2, and as time further passes, both sides are strongly correlated as illustrated in the graph 5-3.

That is, like the graph illustrated in FIG. 2B, a correlation coefficient of the motion amounts among a plurality of positions of the raised cultured cells 1 stably reaches a large value. That is, the cooperativity of motion of cells in each region becomes stronger. Ideally, actions of cells are mutually related, and the cultured cells 1 as a whole pulse as one living body tissues.

The raised cultured cells 1 are composed of a plurality of cells, and a signal is transmitted among the cells through a gap junction. Therefore, correlation in motion is caused among the cells, and the cultured cells 1 as a whole pulse as one living body tissues. The pulsation is propagated among the cells in such raised cultured cells 1.

Cultured cells 1j having high correlation (cooperativity), and in which the pulsation is propagated can be used for evaluation of drugs. For example, a drug is administered to the cultured cells 1 and the motion before and after the administration is observed, so that the effect and the toxicity of the drug, and the like, can be evaluated from a change of the motion of the cultured cells 1.

[Drug Evaluation Apparatus]

Figure 3:
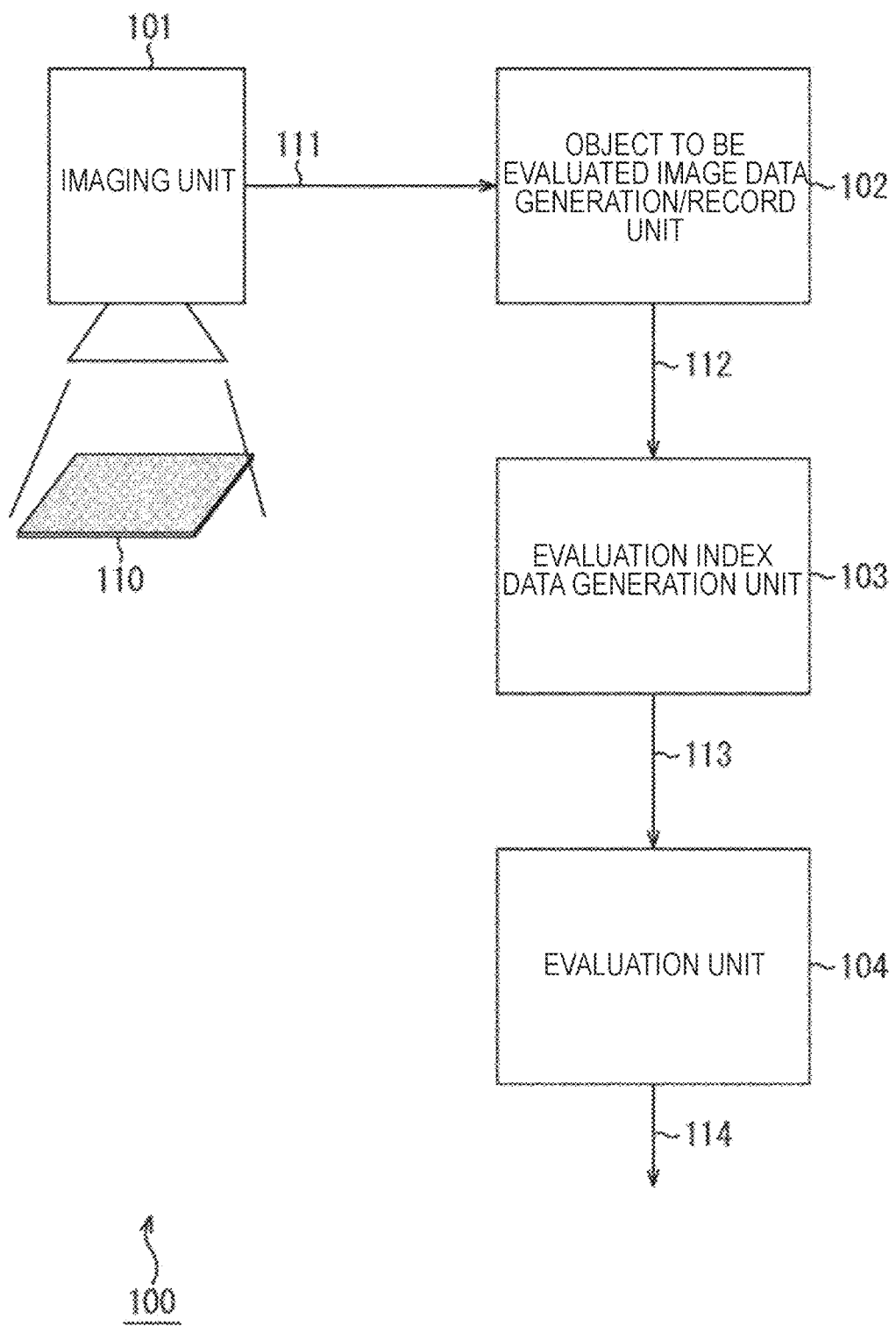
FIG. 3 is a block diagram illustrating a main configuration example of a drug evaluation apparatus.

FIG. 3 is a block diagram illustrating a main configuration example of a drug evaluation apparatus.

A drug evaluation apparatus 100 illustrated in FIG. 3 is an apparatus that conducts evaluation of a drug administered to cultured cardiomyocytes 110 by observing a motion of the cardiomyocytes 110. As illustrated in FIG. 3, the drug evaluation apparatus 100 includes an imaging unit 101, an object to be evaluated image data generation/record unit 102, an evaluation index data generation unit 103, and an evaluation unit 104.

The imaging unit 101 images the cultured cardiomyocytes 110 that are an object to be observed. The imaging unit 101 may image the cultured cardiomyocytes 110 directly (without through other members), or may image the cultured cardiomyocytes 110 through other member, such as a microscope.

Further, the cultured cardiomyocytes 110 may be fixed or may not be fixed to the imaging unit 101. Since the drug evaluation apparatus 100 detect a motion (a temporal change of position), typically, it is more favorable that the cultured cardiomyocytes 110 are fixed to the imaging unit 101.

The imaging unit 101 images the cultured cardiomyocytes 110 during a predetermined period. That is, the imaging unit 101 obtains a moving image of the cultured cardiomyocytes 110 as an object. The imaging unit 101 images the cultured cardiomyocytes 110 before and after the drug administration. Note that the imaging unit 101 may image the cultured cardiomyocytes 110 several times after the drug administration according to a predetermined condition, such as after a predetermined time having passed, for example.

The imaging unit 101 supplies an image signal 111 (a moving image) of the image of the cultured cardiomyocytes 110 obtained by the imaging to the object to be evaluated image data generation/record unit 102.

The object to be evaluated image data generation/record unit 102 generates object to be evaluated image data based on the image signal supplied from the imaging unit 101, and stores and holds the generated object to be evaluated image data in an internal recording medium, for example. The object to be evaluated image data generated here becomes moving image data generated from the image signal obtained by imaging the cultured cardiomyocytes 110, for example.

For example, the object to be evaluated image data generation/record unit 102 may extract only frame images in a part of the period from a plurality of frame images supplied from the imaging unit 101, and may have the frame images as the object to be evaluated image data. Alternatively, for example, the object to be evaluated image data generation/record unit 102 may extract a region of a part of each frame image supplied from the imaging unit 101 as a small frame image, and may have a moving image made of the small frame images as the object to be evaluated image data.

Further, for example, the object to be evaluated image data generation/record unit 102 may apply arbitrary image processing to the frame images supplied from the imaging unit 101, and may have a result of the image processing as the object to be evaluated image data. As the image processing, enlargement, reduction, rotation, and deformation of an image, correction of luminance and color, providing sharpness, removal of noise, creation of intermediate frame image, and the like can be considered. Of course, any image processing other than the above may be employed.

The object to be evaluated image data generation/record unit 102 supplies the stored object to be evaluated image data 112 to the evaluation index data generation unit 103 at a predetermined timing or based on a request from the evaluation index data generation unit 103.

The evaluation index data generation unit 103 performs, in each frame image of the supplied object to be evaluated image data 112, motion detection of the object to be observed (cultured cardiomyocytes 110) for each block that is a subregion obtained by dividing all regions of an image of the object to be observed (cultured cardiomyocytes 110) into a plurality of regions.

The evaluation index data generation unit 103 expresses the detected motion of each block as a motion vector, and obtains the magnitude of the motion vector (motion amount). Note that this motion amount is an absolute value, and therefore, hereinafter, the motion amount will be also referred to as a motion amount absolute value.

The evaluation index data generation unit 103 supplies the motion amount absolute value to the evaluation unit 104 as evaluation index data 113.

The evaluation unit 104 maps the motion amount absolute value supplied as the evaluation index data 113 into a two-dimensional color map, and evaluates the drug by expressing the state of propagation of pulsation and further, by quantitatively evaluating the state thereof. The evaluation unit 104 outputs the two-dimensional color map and a quantitative evaluation result as an evaluation value 114.

The two-dimensional color map indicates the size of a parameter at each position on a plane in color. In this case, the plane represents an observation region of the cultured cardiomyocytes 110, and the color represents the motion amount absolute value (size of the value). That is, a position of the motion amount absolute value is represented by a position on the plane, and the size of the value is represented in color. That is, a distribution of the motion amount absolute value within the observation region is indicated by a change of the color on the plane.

Figure 4:
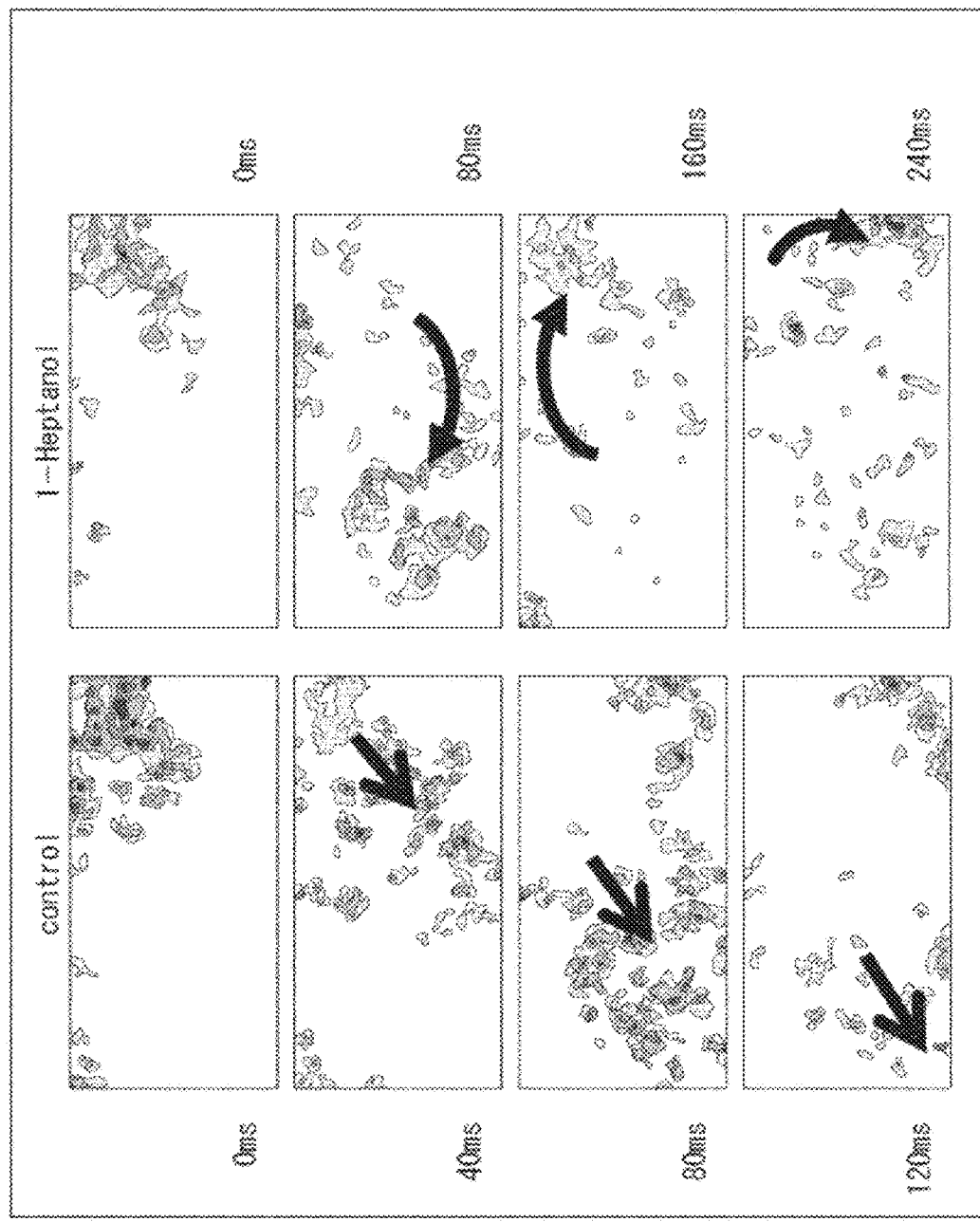
FIG. 4 is a diagram of a visualized example of a state of an influence on propagation of pulsation due to drug administration.
Figure 5:
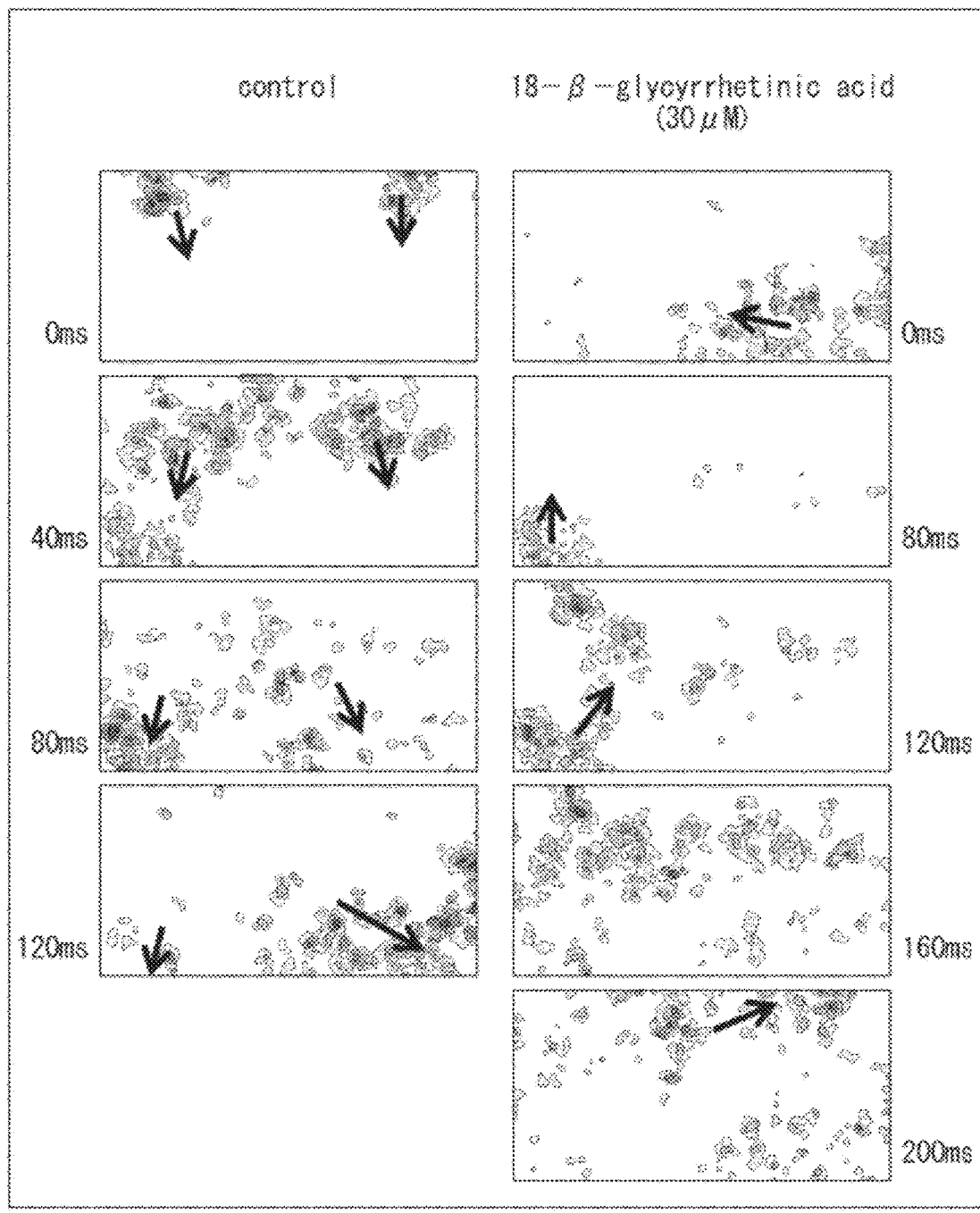
FIG. 5 is a diagram of another visualized example of a state of an influence on propagation of pulsation due to drug administration.
Figure 6:
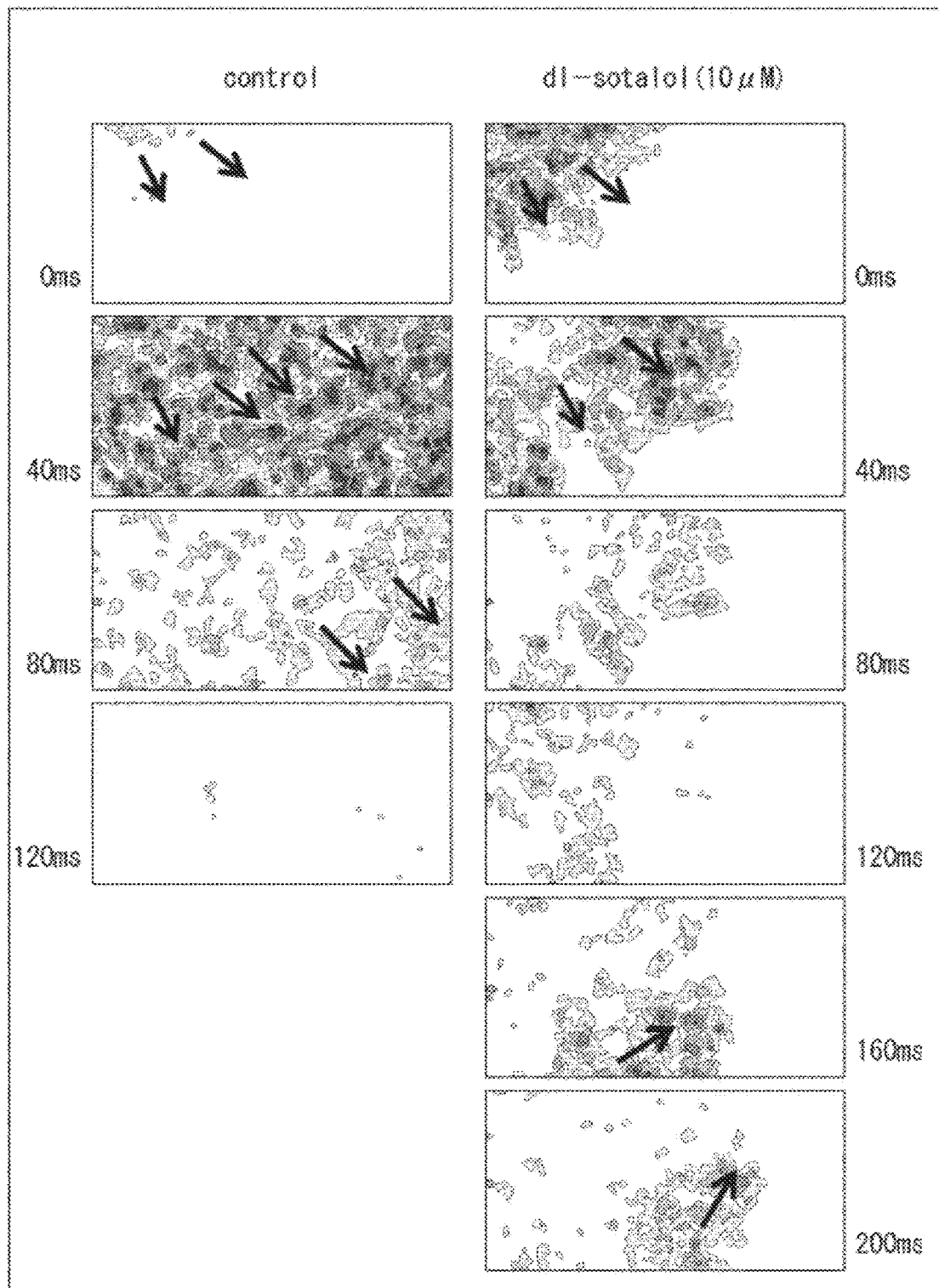
FIG. 6 is a diagram of still another visualized example of a state of an influence on propagation of pulsation due to drug administration.

Examples of such a two-dimensional color map are illustrated in FIGS. 4 to 6. The eight color maps illustrated in FIG. 4 respectively indicate the distribution of the motion amount absolute value within the observation region, and a position on the color map indicates a position within the observation region and higher color density indicates a larger motion amount absolute value. That is, a portion where the color density is high indicates that the portion is intensively pulsing (being in contraction or in relaxation). Note that the arrows on the color maps are drawn for the purpose of description, and they are not drawn on actual color maps.

The four color maps in the left side of the eight color maps illustrate examples of states of propagation of pulsation after administration of an organic solvent (control). The organic solvent basically does not affect the pulsation of the cultured cardiomyocytes 110. An example of the organic solvent includes dimethyl sulfoxide. The four color maps respectively indicate the states of pulsation, in order from above, immediately after the administration (0 ms), after 40 ms have passed from the administration, after 80 ms have passed from the administration, and after 120 ms have passed from the administration.

Further, the four color maps in the right side illustrate examples of states of propagation of pulsation after administration of 1-Heptanol. 1-Heptanol is known to impede a function of a gap junction that relays signal transmission among cells. The four color maps respectively indicate the states of pulsation, in order from the above, immediately after the administration (0 ms), after 80 ms have passed from the administration, after 160 ms have passed from the administration, and after 240 ms have passed from the administration.

In the cases of the left side of the FIG. 4 (in the cases where only the organic solvent is administered), as indicated by the arrows, the pulsation (the portions where the color density is high) expands its area as time passes while being linearly propagated roughly in a direction from an upper right side to a lower left side to be away from initial positions. This indicates a state where the cap junction normally functions and the propagation smoothly proceeds.

In contrast, in the cases of the right side of FIG. 4 (in the cases of the example where 1-Heptanol is administered), as indicated by the arrows, the pulsation (the portions where the color density is high) is linearly propagated as time passes while changing the direction to revolve. That is, the pulsation sometimes proceeds in a direction returning to the initial positions (moving backward). In addition, compared with the left side, the propagation of the pulsation requires a longer time (i.e., the speed of the propagation is slow). This indicates a state where the function of a gap junction is impeded and the propagation does not smoothly proceed.

The color maps of FIG. 5 compare states of propagation of pulsation between after administration of an organic solvent (control) and after administration of 18-β-Glycyrrhetinic acid. 18-β-Glycyrrhetinic acid is known to impede a gap junction, similarly to 1-Heptanol. The five color maps in the right side of FIG. 5 respectively illustrate states of pulsation, in order from the above, immediately after the administration (0 ms), after 80 ms have passed from the administration, after 120 ms have passed after the administration, after 160 ms have passed from the administration, and after 240 ms have passed from the administration.

In the cases of the left side of FIG. 5 (in the cases of the example where only the organic solvent is administered), as indicated by the arrows, the pulsation (the portions where the color density is high) is approximately linearly propagated to be away from the initial positions roughly in a direction from an upper side to a lower side as time passes, similarly to the cases of the left side of FIG. 4. This indicates a state where the cap junction normally functions and the propagation smoothly proceeds.

In contrast, in the cases of the right side of FIG. 5 (in the cases of the example where 18-β-Glycyrrhetinic acid is administered), as indicated by the arrows, the pulsation (the portion where the color density is high) proceeds into various directions, such as from a right side to a left side, from a lower side to an upper side, from a left side to a right side, and the like. Further, in the middle of the propagation, there may be a case where the propagation of the pulsation temporarily stops (the propagation of pulsation is not caused in the object to be observed region). In addition, the propagation of pulsation requires a longer time than the left side (the speed of the propagation is slow). This indicates a state where the function of a gap junction is impeded and the propagation does not smoothly proceed.

The color maps of FIG. 6 compare states of propagation of pulsation after administration of an organic solvent (control) and after administration of DL-sotalol. DL-sotalol is known to impede a potassium channel. The six color maps in the right side of FIG. 6 respectively indicate states of the pulsation, in order from the above, immediately after the administration (0 ms), after 40 ms have passed from the administration, after 80 ms have passed from the administration, after 120 ms have passed from the administration, after 160 ms have passed from the administration, and after 200 ms have passed from the administration.

In the cases of the left side of FIG. 6 (in the cases of the example where only the organic solvent is administered), as indicated by the arrows, the pulsation (the portions where the color density is high) is approximately linearly propagated to be away from original positions roughly in a direction from an upper left side to a lower right side as time passes, similarly to the cases of the left sides of FIGS. 4 and 5. This indicates a state where the pulsation in each cell is stable and the propagation smoothly proceeds.

In contrast, in the cases of the right side of FIG. 6 (in the cases of the example where DL-sotalol is administered), as indicated by the arrows, the pulsation (the portions where the color density is high) is propagated from an upper left side to a lower right side, but the propagation stops within the observation region. Then, the propagation of pulsation proceeding from a lower left side to an upper right side starts. Note that, during the observation period, pulsation is not caused in a part of the observation region in the right side. That is, the pulsation is not propagated in this right side part of the region. In addition, the speed of the propagation is slower than the left side.

When DL-sotalol is administered, a relaxation process is changed due to a change of a potassium channel function that works in the relaxation process. Consequently, waveforms of the pulsation of each cell vary and the pulsation is not smoothly propagated like the examples of the left sides of FIGS. 4 to 6.

The evaluation unit 104 expresses the motion amount absolute value of each block by such a two-dimensional color map. The evaluation unit 104 generates such a two-dimensional color map in predetermined frame intervals (may be in each frame or in a plurality of frames) as illustrated in FIGS. 4 to 6. That is, the evaluation unit 104 expresses the propagation of pulsation by a temporal change of the two-dimensional color maps.

The evaluation unit 104 presents the two-dimensional color map to a user as an image. That is, the drug evaluation apparatus 100 can easily and noninvasively observe the state of the propagation of pulsation and can present a result of the observation. The user can easily and noninvasively evaluate an influence by the administered drug (effect, toxicity, and the like) from the presented state of the propagation of pulsation in the image of the two-dimensional color map.

Note that the evaluation unit 104 can quantitatively evaluate the state of the propagation of pulsation using the two-dimensional color map. In the case of the example of FIG. 4, the states of the propagation after the drug administration illustrated in the right side maps (the states of the linear propagation) is different from the states of the propagation of pulsation after the drug administration illustrated in the left side map (the states of the propagation revolving within the observation region). The evaluation unit 104 compares such states of the propagation of pulsation before and after the drug administration, for example, and can determine whether the state of the propagation of pulsation after the drug administration is normal based on the magnitude of a differential value.

Further, the evaluation unit 104 can also determine whether the state of the propagation of pulsation after the drug administration is normal by detecting a change of the direction of the propagation or the direction (for example, a reverse direction, and the like). Further, the evaluation unit 104 can also determine whether the state of the propagation of pulsation after the drug administration is normal by determining whether the propagation speed is sufficiently fast.

The evaluation unit 104 can output a result of such evaluation as the evaluation value 114. That is, the drug evaluation apparatus 100 can easily and noninvasively observe the state of the propagation of pulsation, and can easily and noninvasively evaluate the object to be evaluated (the influence by the administered drug).

Note that the drug evaluation apparatus 100 may use other things than the cultured cardiomyocytes 110 as the object to be observed. For example, cells other than cardiomyocytes may be used as the object to be observed, or things other than cells can be used as the object to be observed. Note that it is desirable that the object to be observed itself moves and a drug administered to the object to be observed can be evaluated by the evaluation of the motion. Note that the motion may be autonomous (voluntary (active)) motion, or may be a passive motion by an electrical signal and the like supplied from outside.

[Evaluation Index Data Generating Unit]

Figure 1:
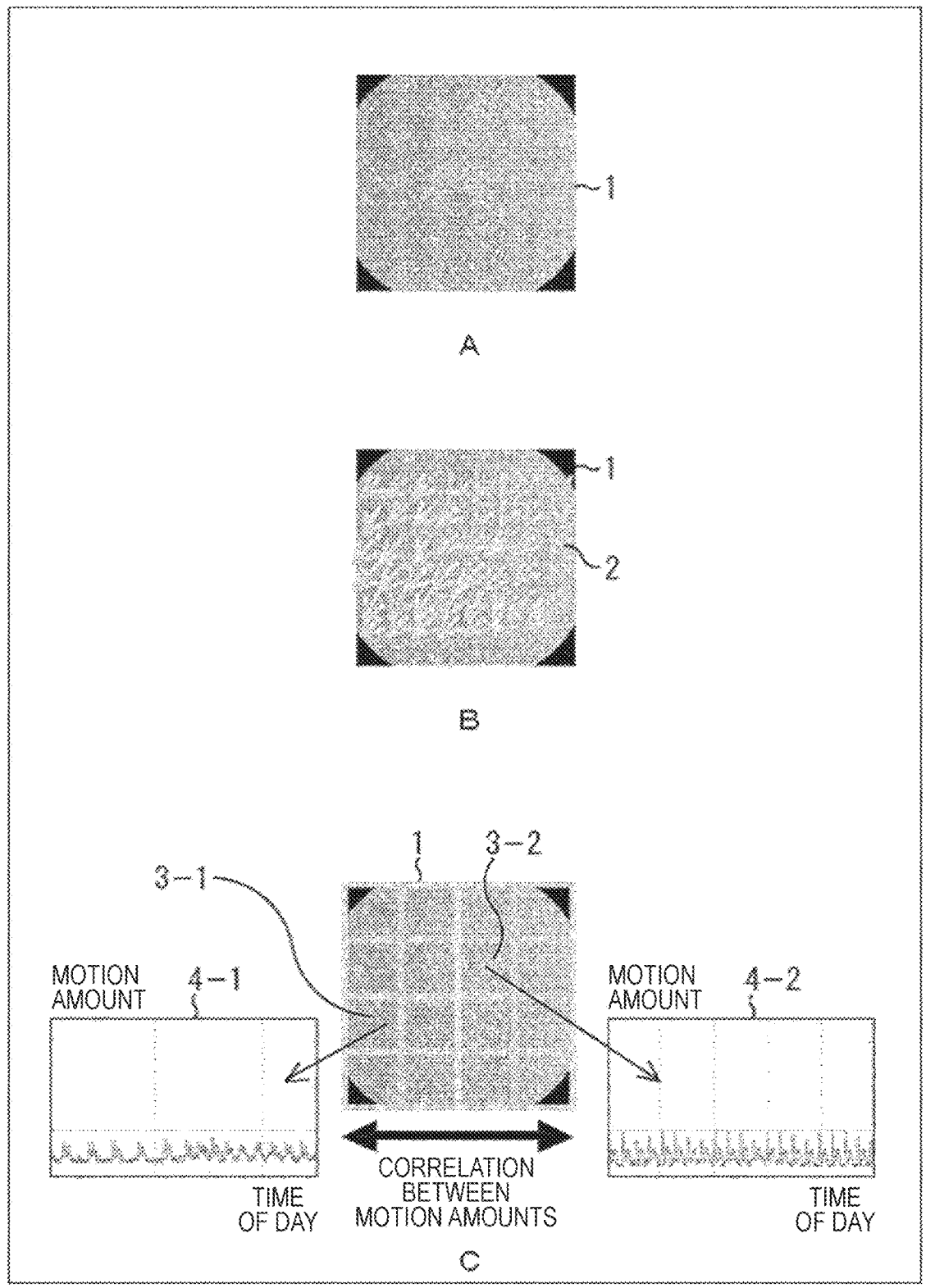
FIG. 1 is a diagram describing cooperativity of motions.
Figure 7:
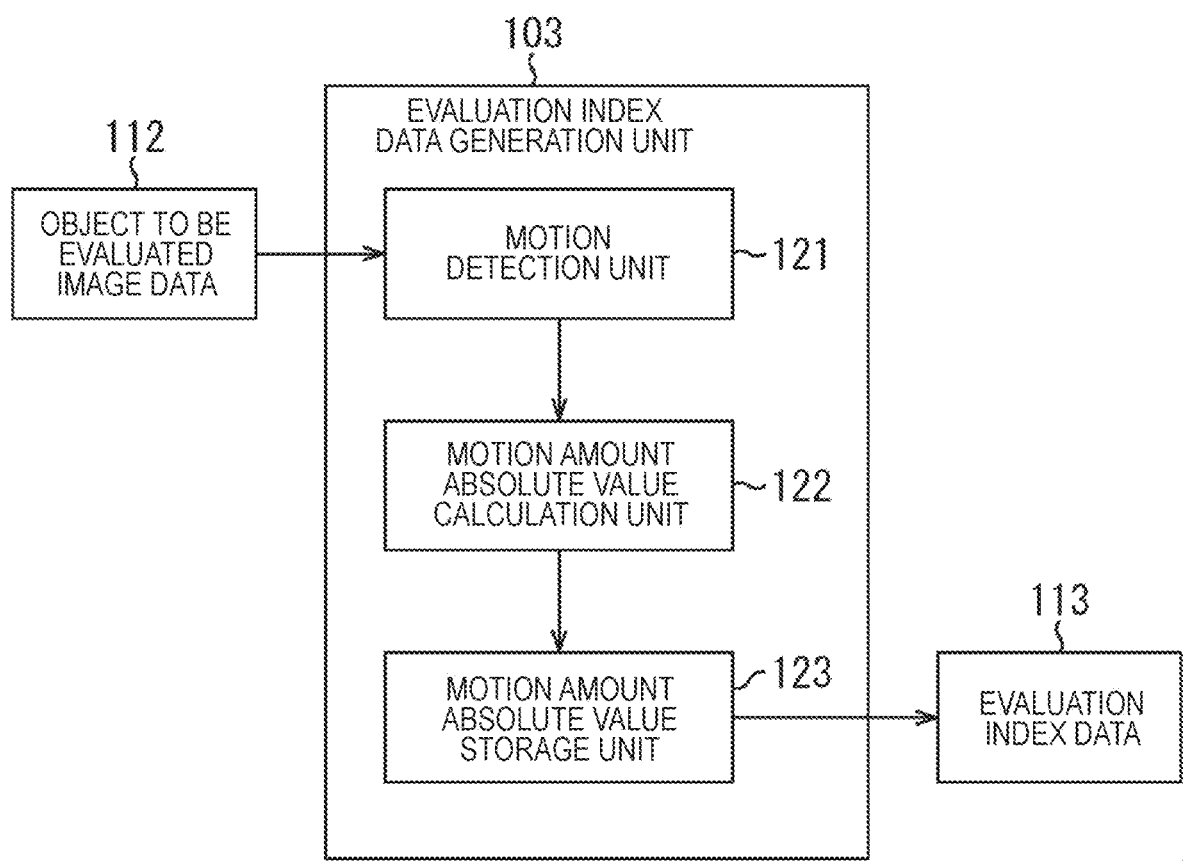
FIG. 7 is a block diagram illustrating a main configuration example of an evaluation index data generation unit.

FIG. 7 is a block diagram illustrating a main configuration example of the evaluation index data generation unit 103 of FIG. 1. As illustrated in FIG. 7, the evaluation index data generation unit 103 includes a motion detection unit 121, a motion amount absolute value calculation unit 122, and a motion amount absolute value storage unit 123.

The motion detection unit 121 inputs the recorded object to be evaluated image data 112 from the object to be evaluated image data generation/record unit 102, performs motion detection for each block, and supplies a result of the detection (a motion vector) to the motion amount absolute value calculation unit 122 as motion detection data.

The motion amount absolute value calculation unit 122 calculates a motion amount absolute value that is the magnitude of each of the supplied motion detection data (motion vector). The motion amount absolute value calculation unit 122 supplies and stores the calculated motion amount absolute value in the motion amount absolute value storage unit 123.

The motion amount absolute value storage unit 123 supplies the stored motion amount absolute value to the evaluation unit 104 at a predetermined timing, or based on a request from the evaluation unit 104, as the evaluation index data 113.

Note that the motion detection unit 121 through the motion amount absolute value storage unit 123 perform the processing for each frame image of the object to be evaluated image data.

[Structure of Object to be Evaluated Image Data]

Figure 8:
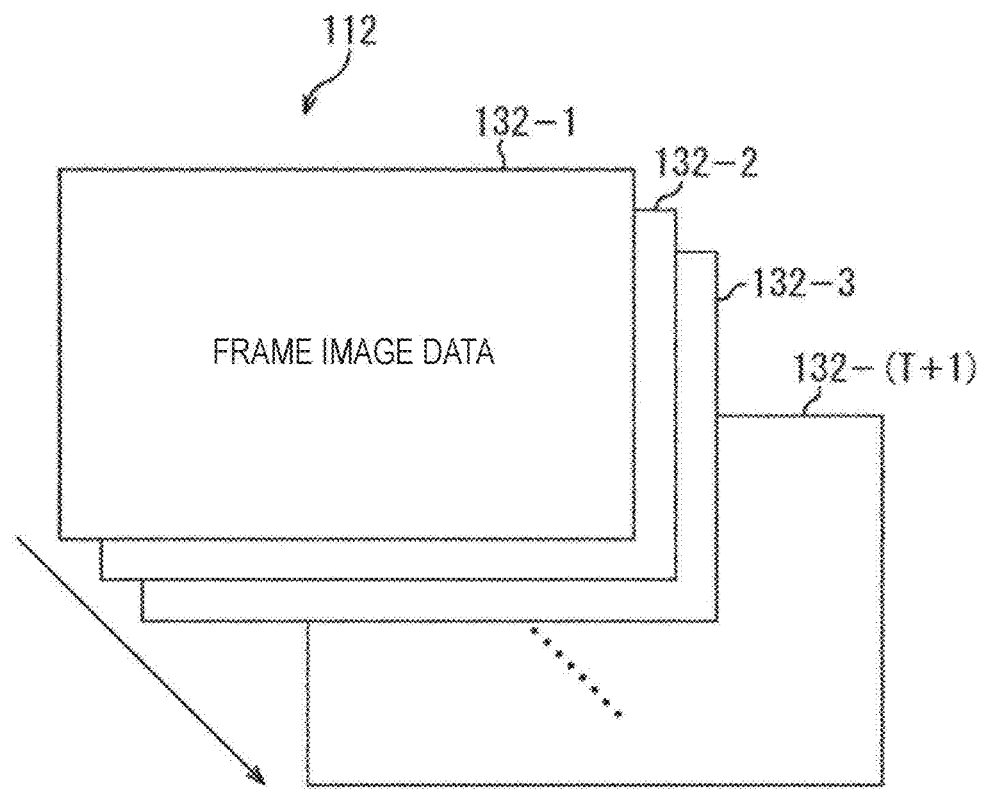
FIG. 8 is a diagram describing a configuration example of object to be evaluated image data.

FIG. 8 illustrates a structure example of the object to be evaluated image data 112 to be supplied to the evaluation index data generation unit 103. Imaging is performed in an evaluation section (for example, T+1 frame (T is an arbitrary natural number)) having a predetermined length. That is, the object to be evaluated image data 112 supplied to the evaluation index data generation unit 103 is made of 1st to (T+1)th frame image data 132-1 to 132-(T+1) corresponding to the evaluation section, for example.

[Configuration Example of Motion Detection Unit]

Figure 9:
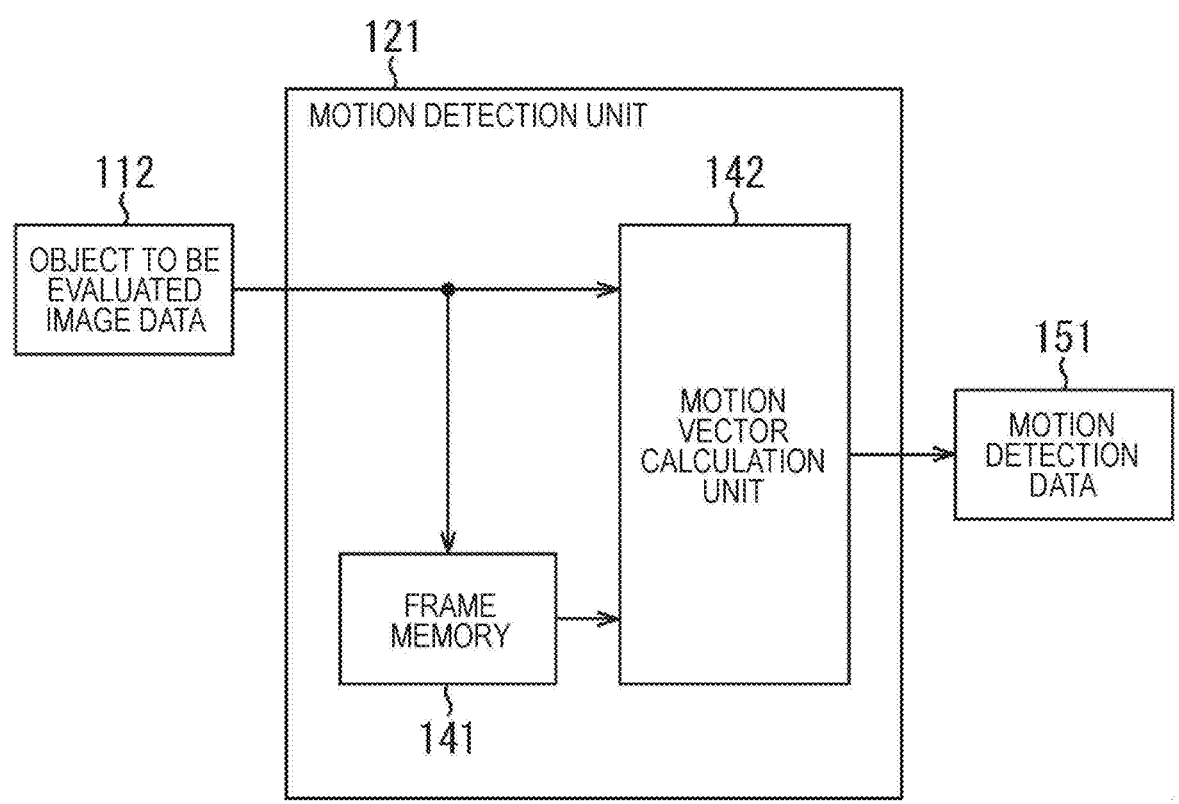
FIG. 9 is a block diagram illustrating a main configuration example of a motion detection unit.

FIG. 9 is a block diagram illustrating a main configuration example of the motion detection unit 121. As illustrated in FIG. 9, the motion detection unit 121 includes a frame memory 141 and a motion vector calculation unit 142. The frame memory 141 holds the frame image data 132 sequentially input in every one frame period as the object to be evaluated image data 112.

The motion vector calculation unit 142 inputs frame image data to be input as the object to be evaluated image data 112 of a current time of day, and frame image data of a one prior time of day (temporally previous time) held in the frame memory 141. Then, the motion vector calculation unit 142 calculates, for each block, a motion vector that indicates a motion between these two frame image data. The calculated motion vector is supplied to the motion amount absolute value calculation unit 122 as motion detection data 151.

Figure 10:
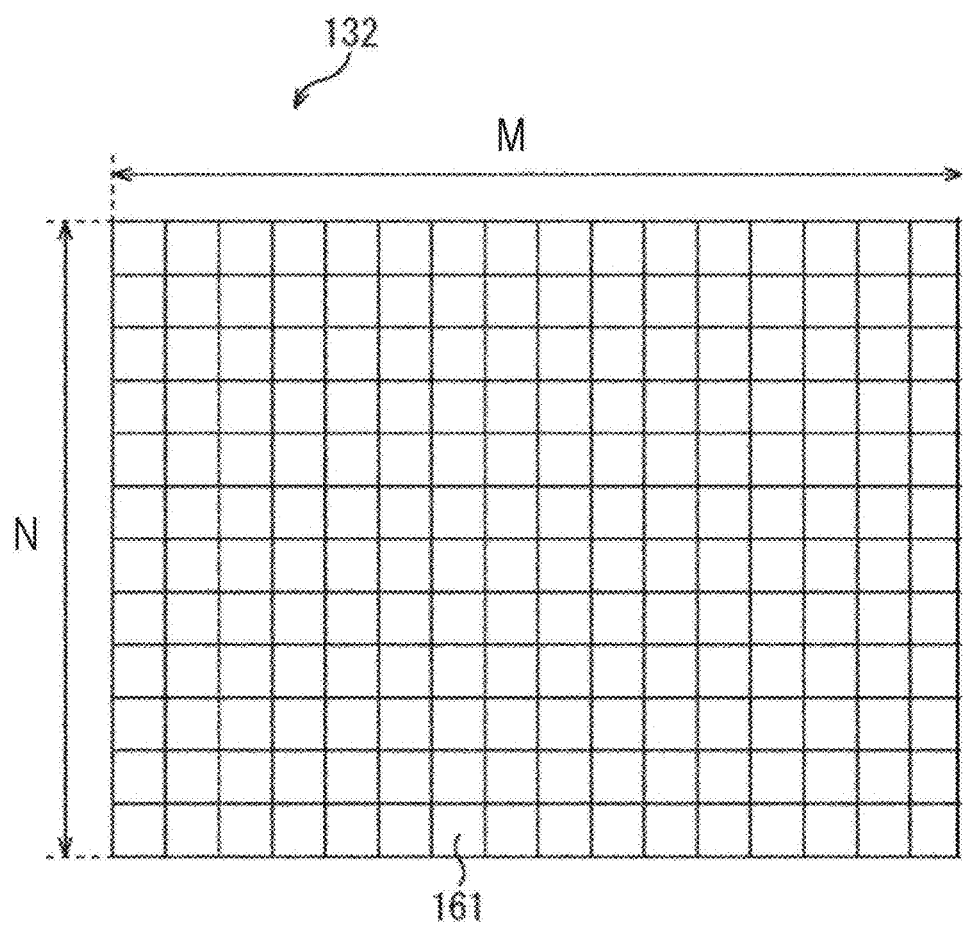
FIG. 10 is a diagram illustrating an example of block division of frame image data.

Processing executed by the motion detection unit 121 of FIG. 9 will be described in more detail. The motion vector calculation unit 142 inputs the frame image data 132 of a current time of day, and the frame image data 132 of a one prior time of day (temporally previous time). The motion vector calculation unit 142 divides these input frame image data 132 into M×N (M and N are arbitrary natural numbers) blocks 161 as illustrated in FIG. 10, performs motion detection by a technique such as block matching between frame images, and generates a motion vector for each block 161. Each of the blocks 161 is made of, for example, (16×16) pixels.

The motion vector calculation unit 142 executes the motion detection processing sequentially using the 1st to (T+1)th frame image data 132. That is, the motion vector calculation unit 142 generates (M×N×T) motion detection data (motion vectors) using (T+1) frame images. The motion vector calculation unit 142 supplies the motion vectors calculated in this way to the motion amount absolute value calculation unit 122 as motion detection data.

Figure 11:
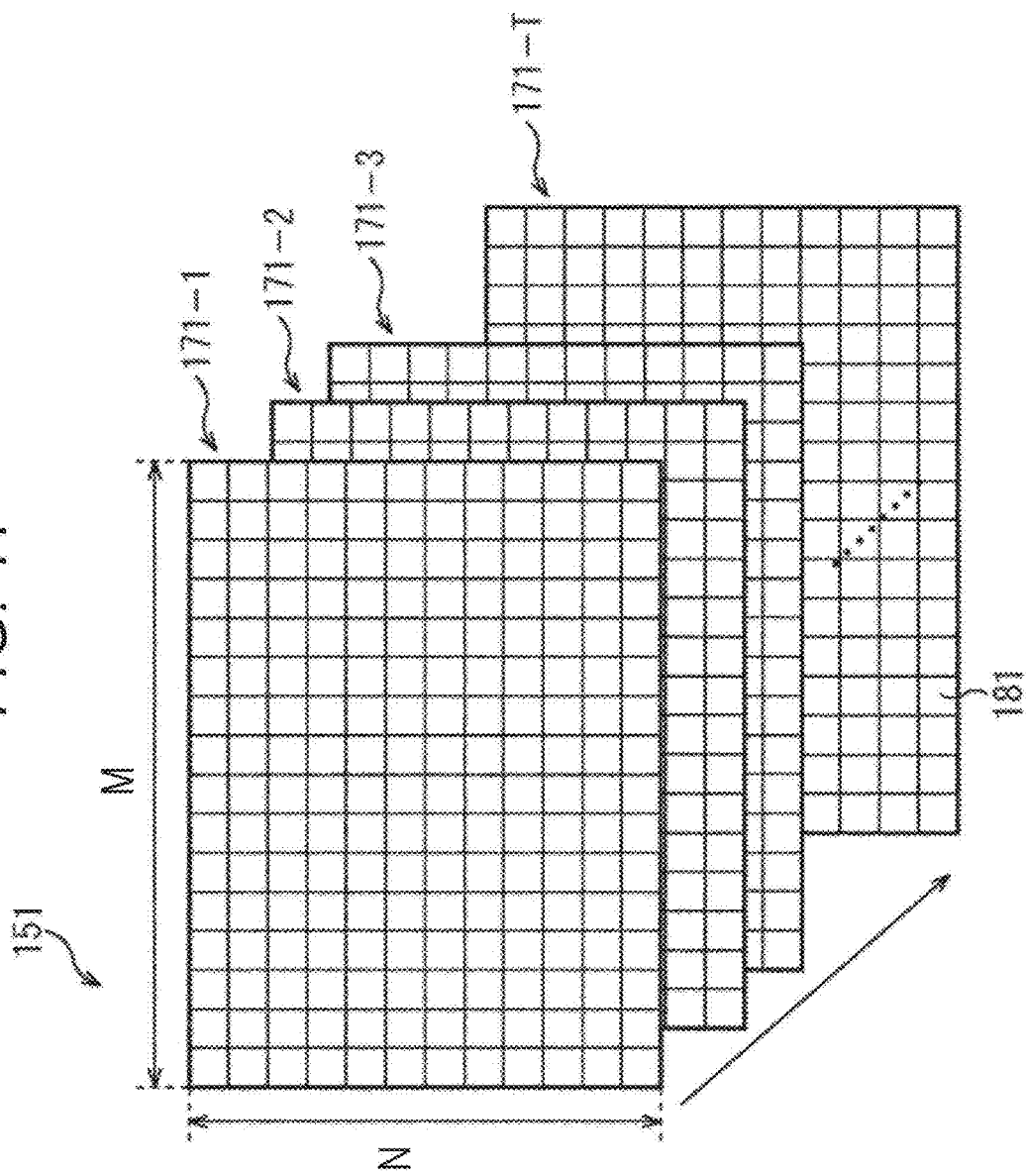
FIG. 11 is a diagram describing a configuration example of motion detection data.

When the last motion detection processing using Tth and (T+1)th frame image data 132 is completed, the motion detection data made of T frame unit motion detection data 171-1 to 171-T is supplied to the motion amount absolute value calculation unit 122, as illustrated in FIG. 11.

Each of the frame unit motion detection data 171-1 to 171-T is obtained by performing the motion detection processing on the frame image data 132 of a current time of day and the frame image data 132 of a one prior (temporally previous time of day) obtained in each frame period.

For example, the 3th frame-unit motion detection data 171-3 is obtained by performing the motion detection by inputting the 4th frame image data 132-4 and 3th frame image data 132-3 as the frame image data of a current time of day and of a one prior time of day, respectively.

Also, each of the frame unit motion detection data 171-1 to 171-T is formed by (M×N) block unit motion detection data 181. Each of the block unit motion detection data 181 corresponds to one block 161, and serves as data that indicates a motion vector detected for a corresponding block 161.

In this way, the motion detection data 151 of the present embodiment has a structure including (M×N) block unit motion detection data 181 for each frame unit motion detection data 171.

[Evaluation Unit]

Figure 12:
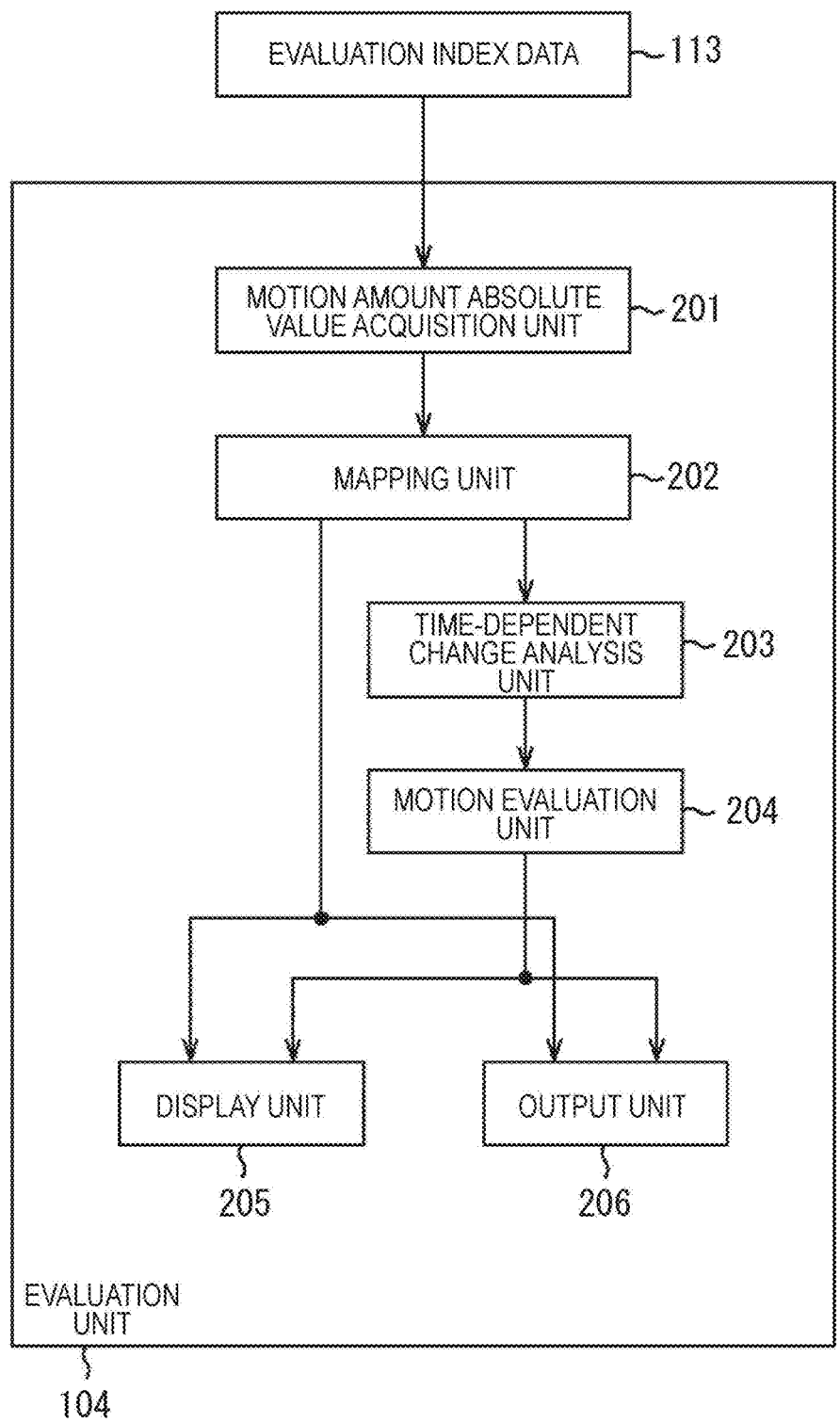
FIG. 12 is a block diagram illustrating a main configuration example of an evaluation unit.

FIG. 12 is a diagram illustrating a main configuration example of the evaluation unit 104. As illustrated in FIG. 12, the evaluation unit 104 includes a motion amount absolute value acquisition unit 201, a mapping unit 202, a time-dependent change analysis unit 203, a motion evaluation unit 204, a display unit 205, and an output unit 206.

The motion amount absolute value acquisition unit 201 acquires a motion amount absolute value of desired object to be evaluated image data 112 (for example, specified by a user as an object to be observed) as evaluation index data 113 from the motion amount absolute value storage unit 123 of the evaluation index data generation unit 103. The motion amount absolute value acquisition unit 201 supplies the acquired motion amount absolute value to the mapping unit 202.

The mapping unit 202 maps the supplied motion amount absolute value on a plane according to the coordinates of the block, and generates a two-dimensional color map like one illustrated in FIG. 4. The mapping unit 202 generates the above-described two-dimensional color map for a plurality of frames (all or a part of the frames of the object to be evaluated image data 112).

The mapping unit 202 supplies the generated two-dimensional color map to the display unit 205 and causes the display unit 205 to display an image thereof, and supplies the two-dimensional color map to the output unit 206 and causes the output unit 206 to output data to an outside of the drug evaluation apparatus 100 (to other apparatuses and the like). Further, the mapping unit 202 also supplies the generated two-dimensional color map to the time-dependent change analysis unit 203.

Note that the mapping unit 202 may just generate information capable of indicating a distribution of the motion amount absolute value, and the generated information is not limited to the two-dimensional color map. For example, three or more dimensional color map may be employed. Further, a gray scale (density or pattern) map may be employed instead of a color map. Further, the mapping unit 202 may map the motion amount absolute value on a curved surface.

The time-dependent change analysis unit 203 analyzes a state of a temporal change (time-dependent change) of each supplied two-dimensional color map (the distribution of the motion amount absolute value). For example, the time-dependent change analysis unit 203 sets a region (or a point) having a predetermined characteristic within the two-dimensional color map as an attention region (or an attention point), and obtains a time-dependent change thereof. The time-dependent change analysis unit 203 supplies the two-dimensional color maps and analysis results of the time-dependent change (for example, the time-dependent change of the size, shape, position, and the like of the attention region) to the motion evaluation unit 204.

The motion evaluation unit 204 evaluates the motion amount distribution based on the supplied information. For example, the motion evaluation unit 204 evaluates a motion of the attention region, and the like. For example, the motion evaluation unit 204 determines whether there is a change in a path of the attention region before and after the drug administration, determines whether there is an extreme change in a proceeding direction of the attention region, and determines whether the proceeding speed of the attention region is changed. The motion evaluation unit 204 supplies data of results of such evaluation to the display unit 205 and causes the display unit 205 to display the data, and supplies the data to the output unit 206 and causes the output unit 206 to output the data to an outside of the drug evaluation apparatus 100 (to other apparatuses and the like).

The display unit 205 includes an arbitrary display device, and causes the display device to display the image signal 111 (cell image) obtained by the imaging unit 101. Further, the display unit 205 creates an image of the two-dimensional color map supplied from the mapping unit 202 and causes the display device to display the image. For example, the display unit 205 superimposes or arranges each frame image of the cell image (moving image) and an image of the two-dimensional color map corresponding to the frame image, and causes the display device to display the image. Further, the display unit 205 creates an image of the evaluation result supplied from the motion evaluation unit 204, and causes the display device to display the image. Note that the image of the evaluation result may be a still image or may be a moving image. Further, the display unit 205 is capable of displaying the image of the evaluation result along with one of or both of the images of the cell image and the two-dimensional color map. In this case, the display unit 205 can superimpose the image of the evaluation result on one of or both of the images of the cell image and the two-dimensional color map and display the images, or can arrange and display the images. Further, in a case where the evaluation result is displayed as a moving image, the display unit 205 can display frame images of the evaluation result along with frame images corresponding to moving images of the cell image or the two-dimensional color map.

The output unit 206 includes an arbitrary output interface, and outputs data of the two-dimensional color map supplied from the mapping unit 202 to a device outside the drug evaluation apparatus 100, a network, and the like, through the output interface. Further, the output unit 206 outputs data of the evaluation result supplied from the motion evaluation unit 204 to a device outside the drug evaluation apparatus 100, a network, and the like, through the output interface.

[Motion Evaluation Unit]

Figure 13:
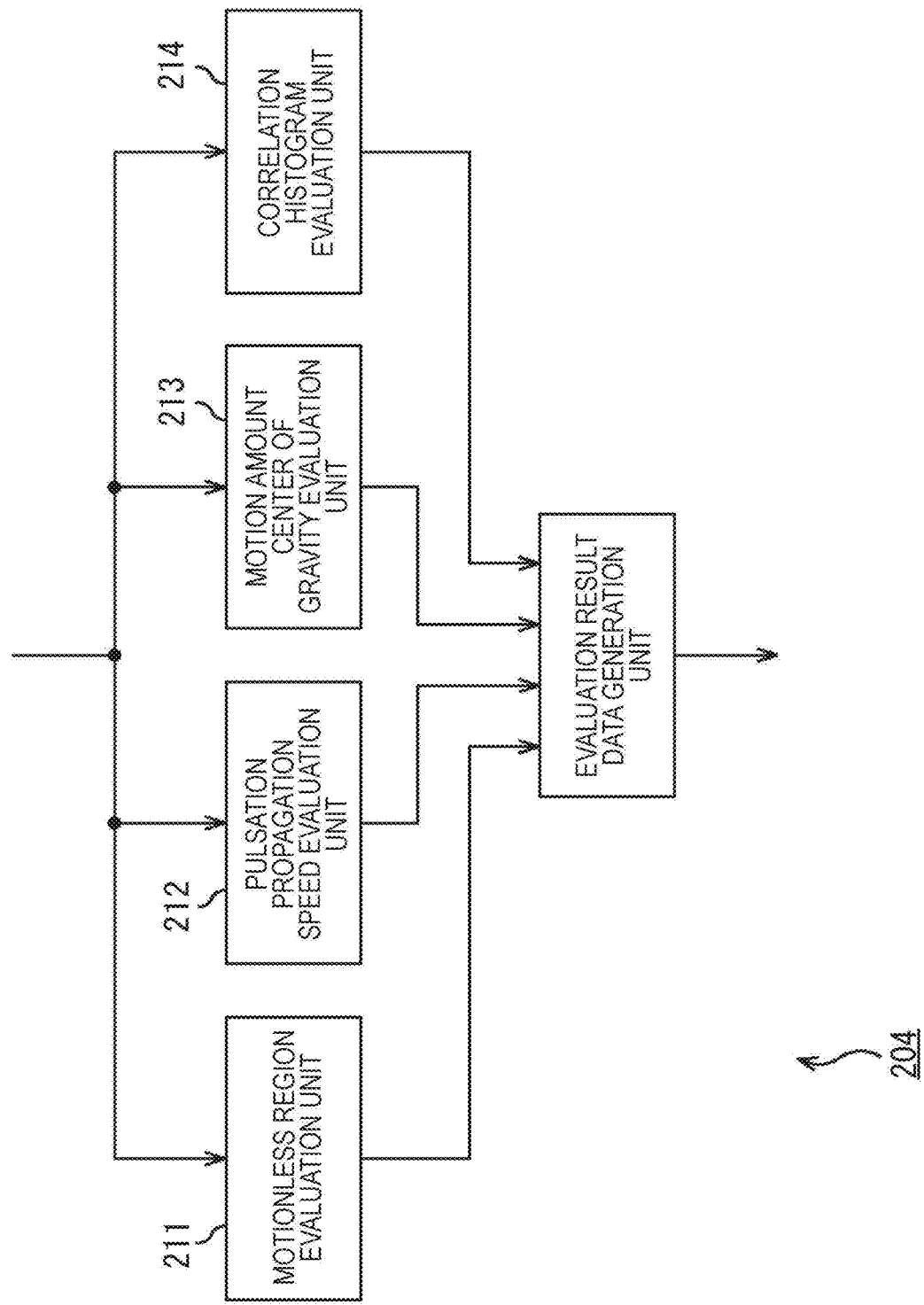
FIG. 13 is a block diagram illustrating a main configuration example of a motion evaluation unit.

FIG. 13 is a block diagram illustrating a main configuration example of the motion evaluation unit 204 of FIG. 12. As illustrated in FIG. 13, the motion evaluation unit 204 includes a motionless region evaluation unit 211, a pulsation propagation speed evaluation unit 212, a motion amount center of gravity evaluation unit 213, and a correlation histogram evaluation unit.

The motionless region evaluation unit 211 evaluates the number and area of regions where pulsation is not propagated (i.e., a region that does not pulse), or a temporal change thereof.

After drug administration, there is a case where a region that does not definitely move (does not pulse) exists within the observation region (motionless region). For example, in the case of FIG. 6, after the administration of DL-sotalol, the pulsation is not propagated to the right side portion of the observation region. That is, the pulsation is stopped.

DL-sotalol impedes the potassium channel. There is a case where the relaxation process is changed due to a change of the potassium channel function that works in the relaxation process when DL-sotalol is administered to the cultured cardiomyocytes, so that the pulsation time (for example, an action potential maintenance time) may be extended. Also, in some cases, the pulsation itself may be stopped. In this way, the motion of the cells may be stopped due to the toxicity of the drug.

The number or an area of the motionless region (or a temporal change thereof) may have relevance to the toxicity of the administered drug. For example, there may be a case where, after the drug administration, it can be evaluated that the larger the number of the motionless regions, or the larger the area of the motionless region, the stronger the toxicity of the drug is. Also, the strength of the toxicity of the drug may be evaluated with a time from immediately after the administration to when the motionless region is increased, a time from when the motionless region is increased to when the motionless region is decreased, and the like.

Therefore, the motionless region evaluation unit 211 uses the motionless region as an attention region, for example, compares the attention regions in the two-dimensional color map before and after the drug administration, and evaluates the number, size, position, shape and the like of the motionless region by the magnitude of a difference thereof (an amount of change). Of course, the motionless region evaluation unit 211 can compare the attention regions within the two-dimensional color map in a plurality of times of day after the drug administration. The motionless region evaluation unit 211 evaluates the toxicity and the influence of the administered drug with such evaluation of motionless region.

The pulsation propagation speed evaluation unit 212 evaluates the propagation speed of pulsation within the observation region or a temporal change thereof.

If the propagation of pulsation is impeded due to the toxicity of the administered drug, it may also influence the propagation speed of the pulsation. For example, if the pulsation time of each cell is extended, the pulsation propagation speed may be changed. That is, the change of the pulsation propagation speed may have relevance to the toxicity of the administered drug. For example, there may be a case where, after the drug administration, it can be evaluated that the larger the margin of reduction of the pulsation propagation speed, the stronger the toxicity of the drug is. Also, the strength of the toxicity of the drug may be evaluated by a time from immediately after the administration to when the propagation speed is reduced, a time from when the propagation speed is reduced to when the propagation speed is recovered, and the like.

Therefore, the pulsation propagation speed evaluation unit 212 uses, for example, a portion that largely pulses as an attention region, compares motions (speeds) of the attention region within the two-dimensional color map before and after the drug administration, and evaluates a change of the pulsation propagation speed by a difference of the speeds of the motion of the attention region (an amount of displacement in a predetermined time). Of course, the pulsation propagation speed evaluation unit 212 can compare the motions of the attention region within the two-dimensional color map at a plurality of times of day after the drug administration. The pulsation propagation speed evaluation unit 212 evaluates the toxicity and the influence of the administered drug by such evaluation of pulsation propagation speed.

The motion amount center of gravity evaluation unit 213 evaluates a position and a locus of the center of gravity of the motion amount within the observation region.

Typically, when pulsation is propagated, the motion of each portion within the observation region is changed, and therefore, the position of the center of gravity of the motion amount within the observation region is changed. That is, the propagation of the pulsation can be expressed in a locus of the position of the center of gravity of the motion amount. In other words, when a state (a path, a speed, and the like) of the pulsation propagation is changed due to the toxicity of the administered drug, the way of changing the position of the center of gravity of the motion amount is also influenced.

For example, as described with reference to FIGS. 4 to 6, the pulsation being linearly propagated in one direction before the drug administration may be propagated to revolve or may be propagated in a plurality of directions after the drug administration. For example, when a motionless region occurs due to the drug administration, the propagation of the pulsation may wrap around a periphery of the motionless region (revolve). Also, even if it stops short of causing a motionless region, when pulsation periods of cells between regions are biased, the direction of the propagation may be changed (revolved) in accordance with the bias.

Further, the pulsation propagation may be divided into a plurality of directions in the motionless region, and the like. Also, in the cardiomyocytes, a part of cells takes a role of pace making, and the propagation of pulsation to other cells is conducted based on the pulsation of the cells. The cells that perform the pace making may be in place of other cells due to the influence of the drug administration. In some cases, the number of cells that perform the pace making may be increased/decreased. In such a case, the path of the pulsation propagation is substantially changed.

Also, the propagation may be stopped in the middle of the propagation. For example, the pulsation propagation ceases in the motionless region. Further, the propagation speed may be changed. For example, the propagation speed may be changed by the pulsation time of each cell being extended.

The pulsation may be propagated to the same region from a plurality of directions at mutually different timings due to a change of the state of the propagation like the above. In such a case, the pulsation of the cells is disordered and re-entry may be locally caused (this may be a cause of an irregular pulse).

Figure 14:
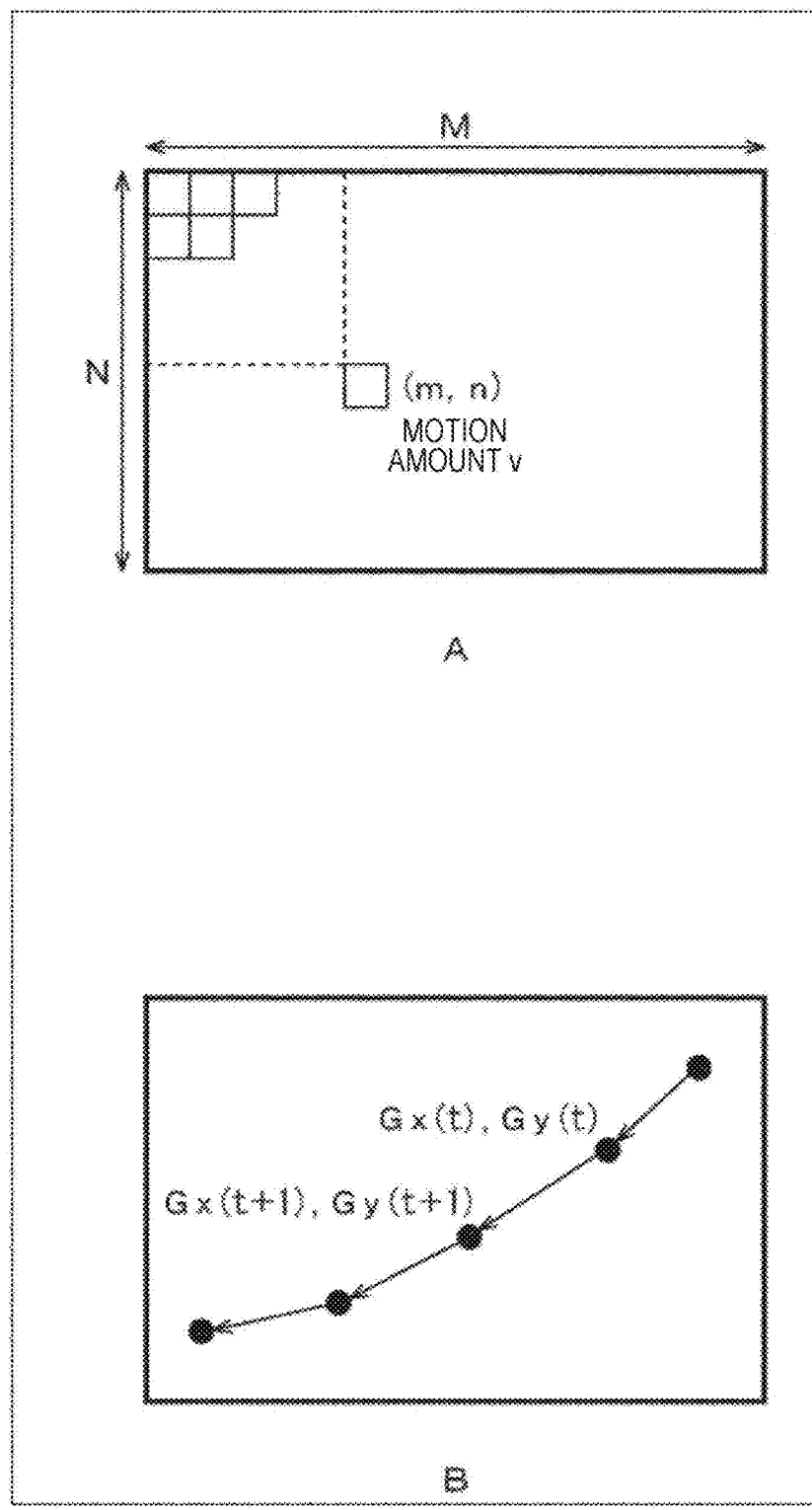
FIG. 14 is a diagram describing an example of a state of motion amount center of gravity evaluation.

The locus of the center of gravity of the motion amount is changed due to such changes of the pulsation propagation. Therefore, the motion amount center of gravity evaluation unit 213 divides, as illustrated in FIG. 14A, all regions on the two-dimensional color map into small regions of N in the vertical direction and M in the horizontal direction, and obtains a motion amount v (m, n) for each small region (m, n). The motion amount center of gravity evaluation unit 213 calculates coordinates (Gx, Gy) of the center of gravity of the motion like the following formulas (1) and (2).

[Mathematical Formula 1]

$$G_x = \frac{1}{MN}\sum_{m=1}^{M}\sum_{n=1}^{N} m \cdot v(m, n) \quad (1)$$

[Mathematical Formula 2]

$$G_y = \frac{1}{MN}\sum_{m=1}^{M}\sum_{n=1}^{N} n \cdot v(m, n) \quad (2)$$

When having obtained the coordinates of the center of gravity of the motion amount for each two-dimensional color map in this way, the motion amount center of gravity evaluation unit 213 plots, as illustrated in FIG. 14B, the position of the center of gravity of each two-dimensional color map (each time of day) on a two-dimensional map, and draws the change (locus). The motion amount center of gravity evaluation unit 213 compares such loci of the center of gravity before and after the drug administration, and evaluates the change of the locus. Of course, the motion amount center of gravity evaluation unit 213 can compare the loci of the center of gravity in a plurality of times of day after the drug administration. The motion amount center of gravity evaluation unit 213 evaluates the toxicity and the influence of the administered drug by such evaluation of locus of the center of gravity of a motion amount.

Note that a plurality of centers of gravity may be used for the evaluation of locus. Also, the motion amount (the magnitude of pulsation) of the center of gravity may be evaluated together. For example, the motion amount center of gravity evaluation unit 213 may plot the center of gravity of the motion amount on a three-dimensional map that expresses the position in the XY coordinates and the motion amount in the Z coordinate. Any method may be employed for the calculation of the motion amount of the center of gravity. For example, an obtained motion amount of the position of the center of gravity may be employed as the motion amount of the center of gravity, or an average value of motion amounts in the vicinity of the center of gravity may be employed as the motion amount. Alternatively, the motion amount of the center of gravity may be calculated using a motion amount of the whole observation region.

The correlation histogram evaluation unit 214 evaluates a distribution (a speed, a direction, and the like) of a motion within the observation region.

The cardiomyocytes repeats pulsation in a predetermined rhythm in a normal state before the drug administration. Therefore, the distribution (speed, direction, and the like) of the motion within the observation region becomes approximately constant. After the drug administration, when the state of the propagation of pulsation is changed, as described above, due to the toxicity of the administered drug, the distribution of the motion is also changed. Therefore, the correlation histogram evaluation unit 214 evaluates the toxicity and the influence of the administered drug by obtaining the distribution (histogram) of the speed and direction of the motion before and after the drug administration and by evaluating the change of the distribution.

Figure 15:
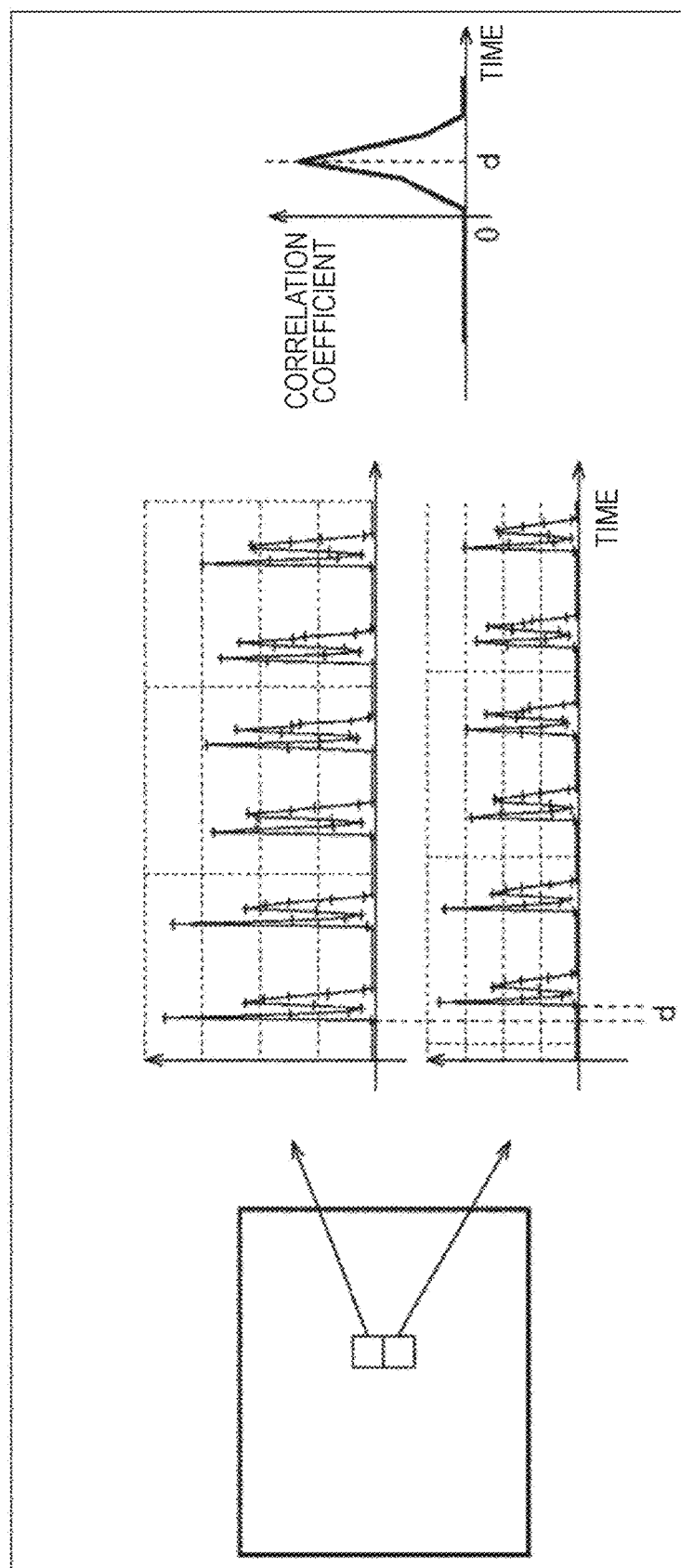
FIG. 15 is a diagram describing an example of a state of correlation histogram evaluation.

More specific example will be described. For example, the correlation histogram evaluation unit 214 obtains a correlation coefficient d of pulsation between adjacent small regions, as illustrated in FIG. 15. This correlation coefficient d is, as illustrated in the center of FIG. 15, a parameter that indicates a gap of timings of the pulsation, and as illustrated in the right side of FIG. 15, the larger the gap is, the larger the value is. That is, the correlation coefficient d is maximized in a state where the timings of the pulsation of the both small regions are shifted by half period. When the timings of the pulsation of the both small regions coincide, the value of the correlation coefficient d is 0.

Figure 16:
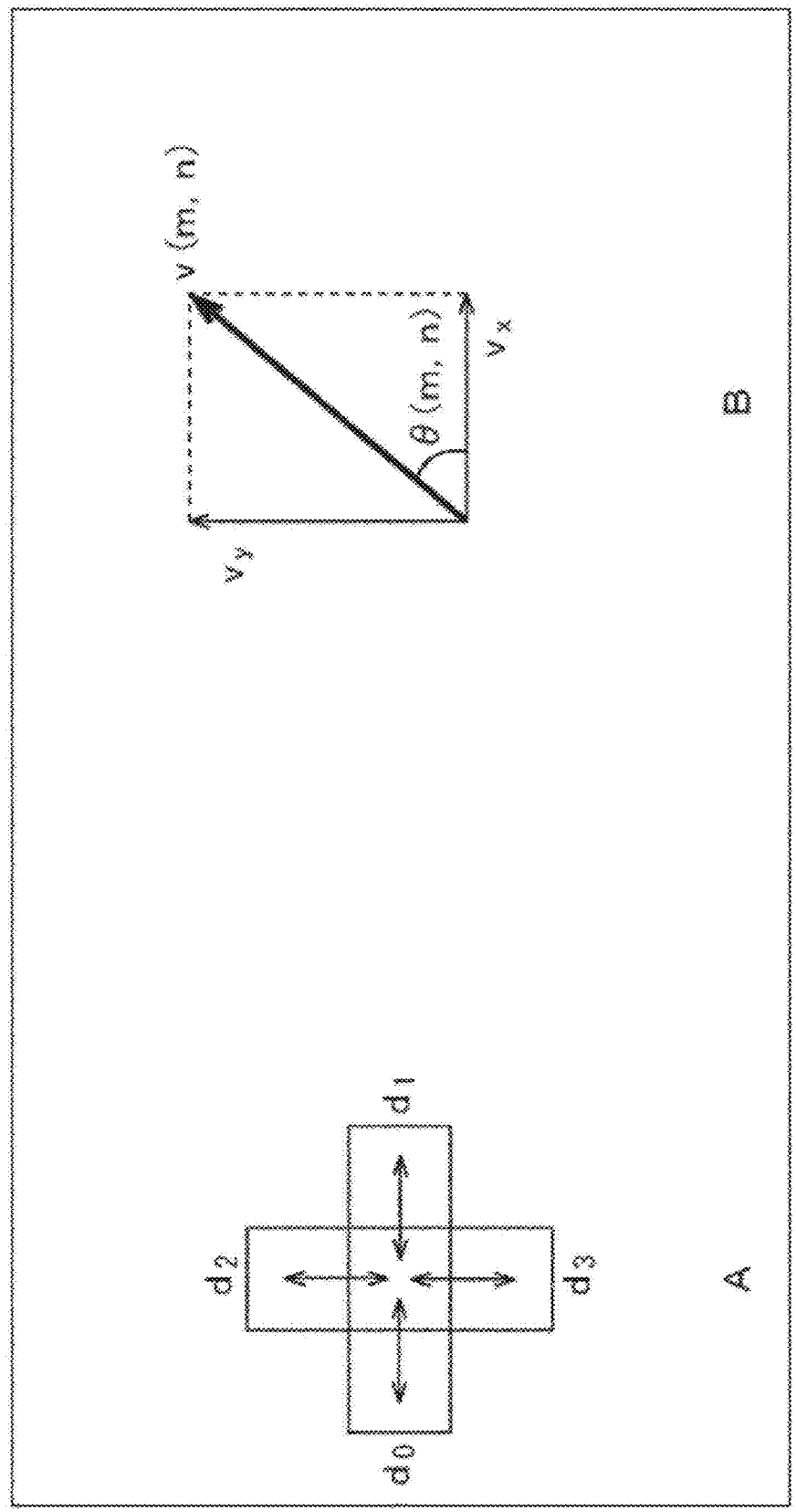
FIG. 16 is a diagram describing an example of a state of correlation histogram evaluation, which follows FIG. 15.

The correlation histogram evaluation unit 214 calculates such a correlation coefficient d for each of neighboring small regions on the left, right, top and bottom of a small region to be processed, as illustrated in FIG. 16A ($d_0$ to $d_3$). The correlation histogram evaluation unit 214 calculates a motion amount $v_x$ in the horizontal direction and a motion amount $v_y$ in the vertical direction using the correlation coefficients d ($d_0$ to $d_3$) like the following formulas (3) and (4).

[Mathematical Formula 3]

$$v_x = \frac{1}{2}(d_1 - d_0) \quad (3)$$

[Mathematical Formula 4]

$$v_y = \frac{1}{2}(d_3 - d_2) \quad (4)$$

Figure 17:
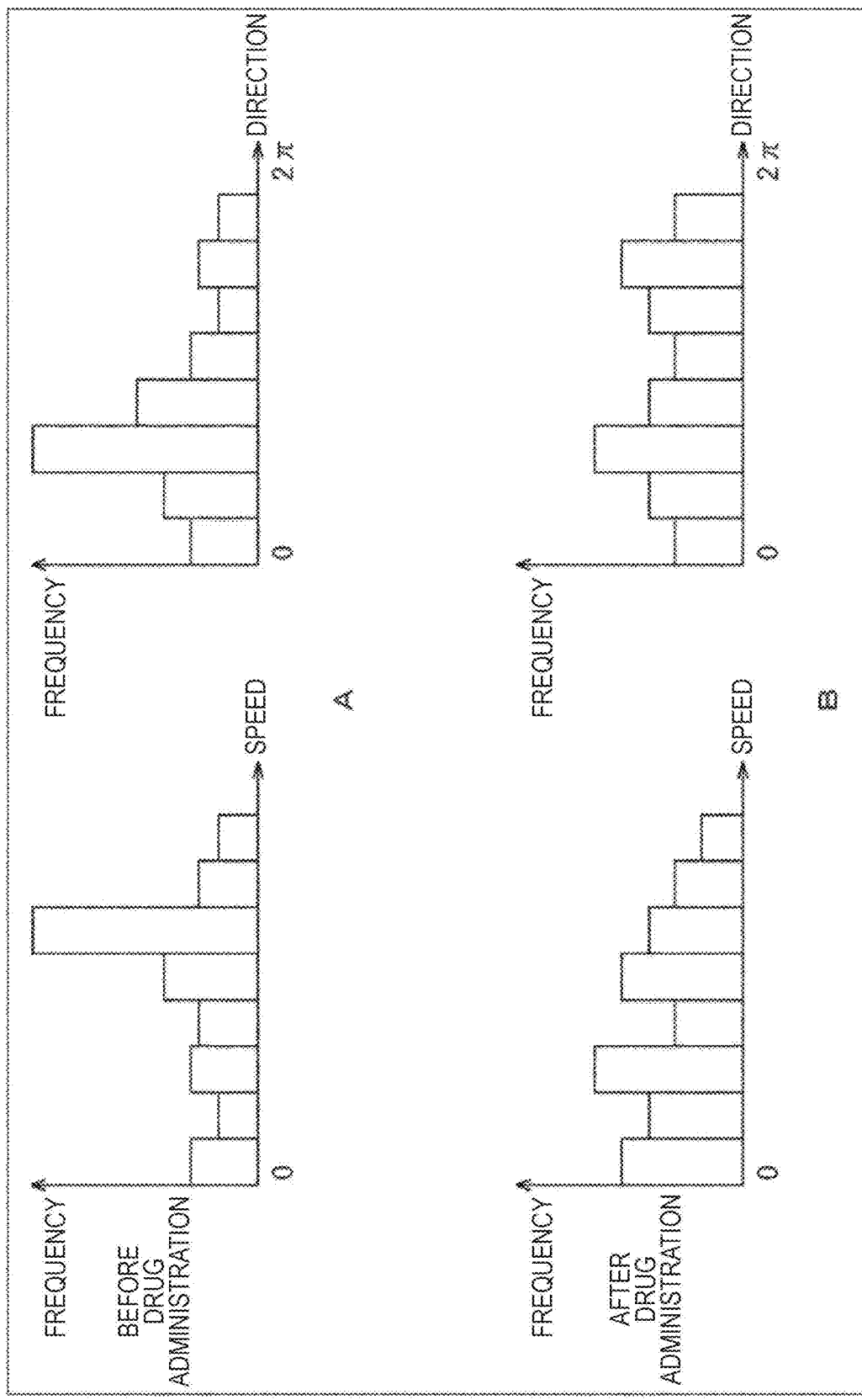
FIG. 17 is a diagram describing an example of a state of correlation histogram evaluation, which follows FIG. 16.

The correlation histogram evaluation unit 214 obtains a motion amount v (m, n) of the small region to be processed (m, n) and its direction θ (m, n) from the motion amounts $v_x$ and $v_y$, as illustrated in FIG. 16B. The correlation histogram evaluation unit 214 obtains the motion amount and its direction for each small region in this way, and generates a histogram (a frequency distribution) of the motion amount (speed) and the direction like ones illustrated in FIG. 17.

FIG. 17A illustrates a histogram of a speed and a direction of a motion before the drug administration and FIG. 17B illustrates a histogram of a speed and a direction of a motion after the drug administration. As illustrated in FIGS. 17A and 17B, when the distributions before and after the drug administration are different, it can be determined that there is an influence due to the drug administration. That is, the correlation histogram evaluation unit 214 evaluates the toxicity and the influence of the administered drug by obtaining the distributions (histograms) about the speed and direction of the motion before and after the drug administration, and evaluating a change of the distributions.

The motionless region evaluation unit 211 through the correlation histogram evaluation unit 214 respectively supply obtained result of the evaluation to an evaluation result data generation unit 215. The evaluation result data generation unit 215 appropriately sums up the evaluation results, and supplies the results to the display unit 205 and the output unit 206 (FIG. 12) as evaluation result data.

Note that the above-described configuration of the motion evaluation unit 204 is an example. The motion evaluation unit 204 can have any configuration, and can evaluate any index as long as it relates to a motion of an object to be observed.

As described above, the drug evaluation apparatus 100 can easily and noninvasively observe the state of the propagation of pulsation of the cultured cardiomyocytes 110, and can easily and noninvasively evaluate the object to be evaluated (the influence due to the administered drug).

[Flow of Evaluation Process]

Next, an example of a flow of evaluation processing executed by the drug evaluation apparatus 100 will be described with reference to a flowchart of FIG. 18.

When the evaluation processing is started, the imaging unit 101 of the drug evaluation apparatus 100 images the cultured cardiomyocytes 110 that are an object to be observed in step S101. In step S102, the object to be evaluated image data generation/record unit 102 generates the object to be evaluated image data 112 from the image signal 111 obtained by the imaging in step S101.

In step S103, the evaluation index data generation unit 103 performs motion detection using the object to be evaluated image data 112 generated in step S102, calculates a motion amount absolute value, and generates the evaluation index data 113. In step S104, the evaluation unit 104 generates the two-dimensional color map using the evaluation index data 113 generated in step S103, and calculates the evaluation value 114.

In step S105, the evaluation unit 104 outputs the evaluation value 114 calculated in step S104, and terminates the evaluation processing.

[Flow of Evaluation Index Data Generation Processing]

Next, an example of a flow of evaluation index data generation processing executed in step S103 of FIG. 18 will be described with reference to a flowchart of FIG. 19.

When the evaluation index data generation processing is started, the motion detection unit 121 of the evaluation index data generation unit 103 detects a motion of the object to be evaluated for each block in step S121, and generates a motion vector. In step S122, the motion amount absolute value calculation unit 122 calculates a motion amount absolute value of the motion vector of each block generated in step S121.

In step S123, the motion amount absolute value storage unit 123 stores the motion amount absolute value calculated in step S122.

In step S124, the motion detection unit 121 determines whether data of a predetermined period (evaluation section) have been processed. When it is determined that a frame image that has not been subjected to the motion detection exists in the predetermined evaluation section, the motion detection unit 121 returns the processing to step S121, and repeats the motion detection on a new frame image to be processed Further, in step S124, it is determined that all frame images that are supposed to be processed in the predetermined evaluation section has been subjected to the motion detection, the evaluation index data generation processing is terminated, and the processing is returned to FIG. 18 and proceeds to step S104.

[Flow of Correlation Evaluation Processing]

Next, an example of a flow of influence evaluation processing executed in step S104 of FIG. 18 will be described with reference to a flowchart of FIG. 20.

When the influence evaluation processing is started, the motion amount absolute value acquisition unit 201 acquires the motion amount absolute value from the motion amount absolute value storage unit 123 in step S141.

In step S142, the mapping unit 202 maps the motion amount absolute value acquired in step S141 on a plane, and creates a two-dimensional color map.

In step S143, the time-dependent change analysis unit 203 analyzes a time-dependent change of the two-dimensional color map in each two-dimensional color map of the motion amount absolute value created in step S142.

In step S144, the motion evaluation unit 204 evaluates a temporal change of the two-dimensional color maps (the motions among the two-dimensional color maps) analyzed in step S143. That is, the motion evaluation unit 204 evaluates the influence of the drug administration. The motion evaluation unit 204 causes the display unit 205 to display the evaluation value 114, and outputs the value outside the drug evaluation apparatus 100 through the output unit 206.

Figure 18:
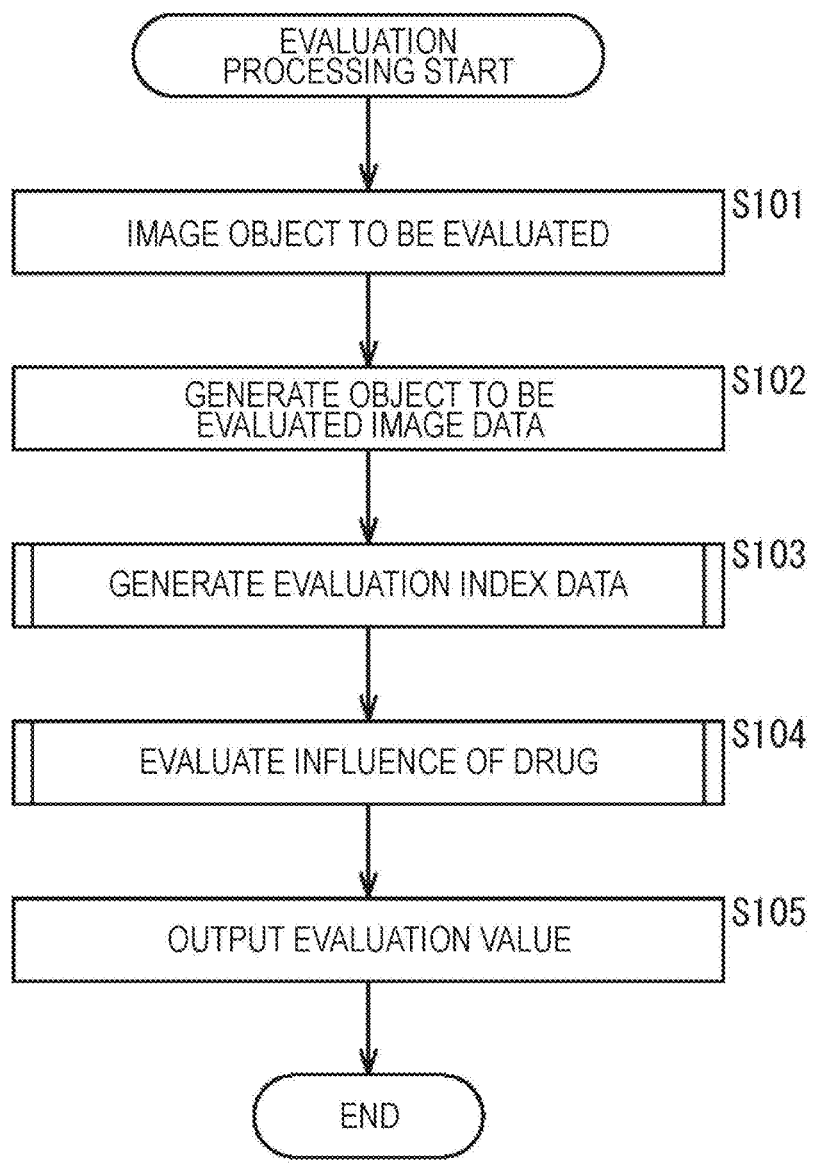
FIG. 18 is a flowchart describing an example of a flow of evaluation processing.
Figure 19:
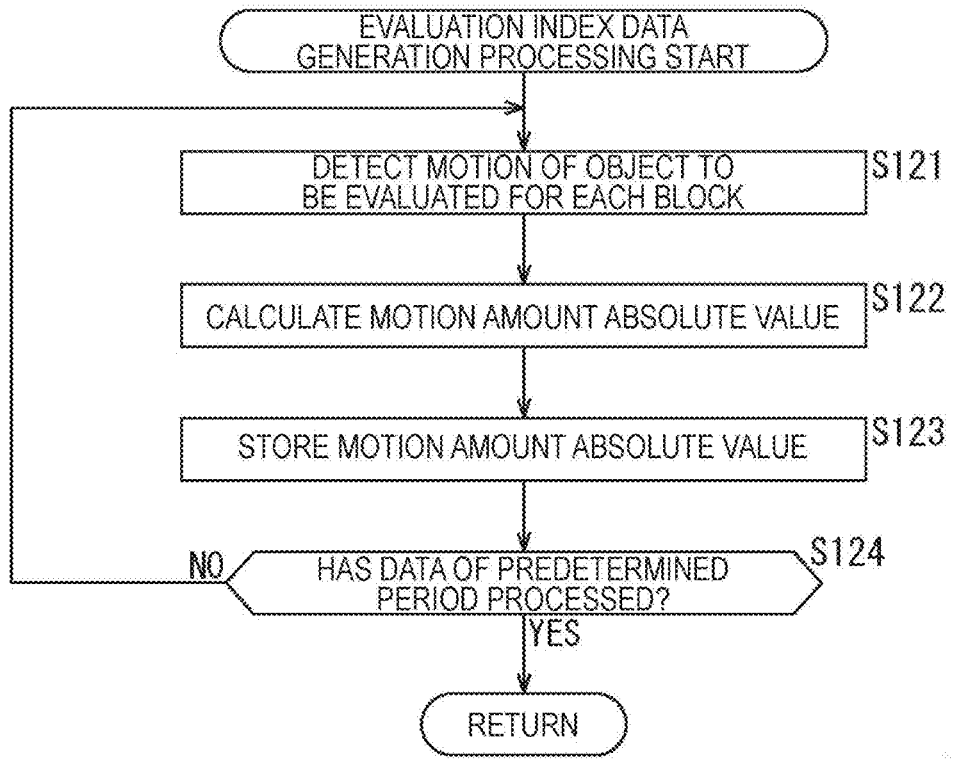
FIG. 19 is a flowchart describing an example of a flow of evaluation index data generation processing.

When the processing in step S144 is completed, the motion evaluation unit 204 terminates the influence evaluation processing and returns the processing to FIG. 18.

[Flow of Motion Evaluation Processing]

Next, an example of a flow of motion evaluation processing executed in step S144 of FIG. 20 will be described with reference to a flowchart of FIG. 21.

When the motion evaluation processing is started, the motionless region evaluation unit 211 evaluates the motionless region in step S161. In step S162, the pulsation propagation speed evaluation unit 212 evaluates the pulsation propagation speed. In step S163, the motion amount center of gravity evaluation unit 213 evaluates the center of gravity of the motion amount. In step S164, the correlation histogram evaluation unit 214 evaluates the speed and direction of the pulsation propagation with the histogram. In step S165, the evaluation result data generation unit 215 generates the evaluation result data for output or for display.

Figure 20:
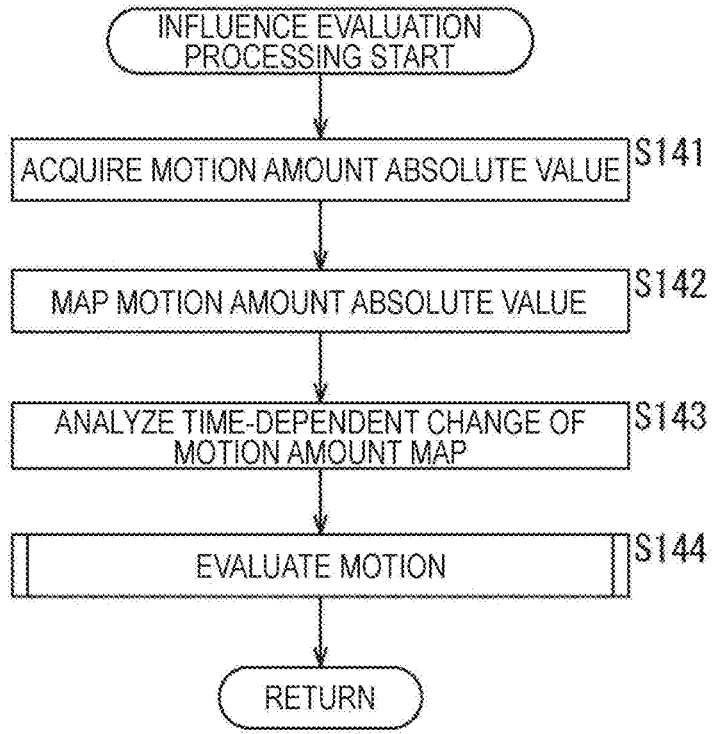
FIG. 20 is a flowchart describing an example of a flow of influence evaluation processing.
Figure 21:
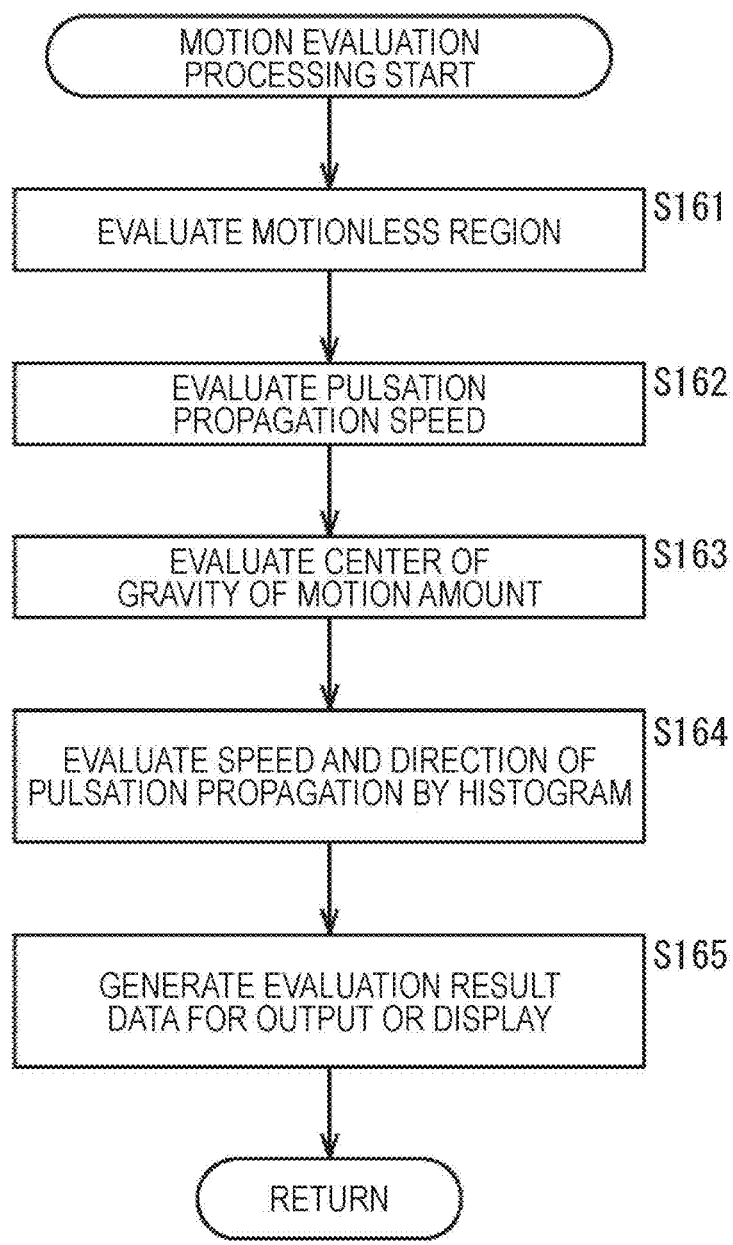
FIG. 21 is a flowchart describing an example of a flow of motion evaluation processing.

When the processing in step S165 is completed, the evaluation result data generation unit 215 terminates the motion evaluation processing and returns the processing to FIG. 20.

As described above, the drug evaluation apparatus 100 can easily and noninvasively observe the object to be observed, and can easily and noninvasively evaluate the influence of the drug administration on the cultured cardiomyocytes 110 by performing various types of processing.

That is, in the present technology, a special culture dish or a fluorescence reagent are not necessary. Therefore, the change of the cell pulsation behavior can be captured in a simple, noninvasive, and less expensive manner, so that the drug toxicity, and the like can be easily and accurately evaluated. Further, it is favorable for automation.

Note that, there are, typically, two types of toxicity of a drug: short-term toxicity in which the influence is shown in a short term, such as about a few seconds to a few minutes after the drug administration, and long-term toxicity in which the influence is shown after a long term has passed, such as a few hours to a few days, after the drug administration. When a fluorescence reagent or an electrode is used, the object to be observed is influenced. Therefore, it may be unfavorable for long-term toxicity observation. In contrast, the present technology can noninvasively observe the object to be observed. Further, in the present technology, the long-term toxicity observation can be conducted in a similar method to the short-term toxicity observation. Therefore, the present technology is favorable not only for the short-term toxicity observation but also for the long-term toxicity observation.

Further, the present technology can conduct the short-term toxicity observation and the long-term toxicity observation in mutually similar methods. Therefore, the long-term observation, such as observation taking a few days immediately after the drug administration, can be conducted. That is, the present technology can also observe and evaluate a time-dependent change of toxicity.

Note that, when cultured cells that are an object to be observed grow in a dense manner, dyeing by a fluorescence reagent typically becomes difficult. However, in the present technology, the object to be observed can be noninvasively observed, and therefore, the observation and evaluation can be stably conducted irrespective of the degree of growth of the cultured cells.

By the way, the pulsation of the cardiomyocytes is composed of contraction and relaxation. Typically, relaxation of the myocardium corresponds to T wave in an electrocardiogram, and corresponds to the repolarization of a myocardial cell membrane. This T wave prolongation is typically called QT prolongation as prolongation of time between Q wave and T wave, and when this symptom is displayed, a possibility of an irregular pulse is pointed out. For example, when taking in and out of ion to the potassium channel is impeded due to the drug administered to the cultured cardiomyocytes, such QT prolongation occurs. For example, DL-sotalol is known to impede the potassium channel. That is, when DL-sotalol is administered to the cultured cardiomyocytes, the relaxation process is changed due to a change of a potassium channel function that works in the relaxation process.

However, in reality, even in a case where the QT prolongation occurs, when approximately uniform QT prolongation occurs in the whole cardiomyocytes, a substantial gap of pulsation is not caused among the cells, and therefore, there may be a case where no irregular pulse occurs. In contrast, if the gap junction is impeded as described above, an irregular pulse may be caused even if the QT prolongation is not caused. In the present technology, the propagation of pulsation can be easily and noninvasively observed. Therefore, occurrence of an irregular pulse can be detected irrespective of occurrence of such QT prolongation.

Further, in the present technology, since the observation region can be a relatively narrow region, such as about 0.6 sq. mm, a test can be conducted with a small number of cells and few reagents. Further, the test can be sufficiently evaluated with a commercially available high-density culture plate (1536 well plate (1.7 mm diameter/1 well) or 384 well plate (3.6 mm diameter/1 well), and the present technology is favorable for initial screening in a drug development. Note that, in the present technology, the observation can be conducted in a similar method irrespective of the area of observation. Therefore, the observation area can be easily changed.

Further, the method of evaluating the toxicity of a drug is currently proceeding, and there is a possibility that a new way of evaluation or evaluation criteria is proposed in the future. Since the state of an object to be observed can be noninvasively observed, the present technology can be applied to more various evaluation methods or evaluation criteria.

Further, the present technology can be applied to any case of evaluating anything as long as it can be evaluated by observing the cultured cardiomyocytes 110. For example, it can be a gas, a liquid, or a solid. Also, it can be environmental conditions at the time of observation (for example, the temperature, humidity, atmospheric pressure, brightness, vibration, magnetic field, and the like).

Note that, since the present technology can easily observe the propagation of pulsation, the present technology can be applied to a method in which pulsation rhythm of cells is detected by putting a fluorescent dye and detecting the calcium concentration that fluctuates according to the excitement of the cells (action potential), and an information propagation pattern of the cells is evaluated.

2. Second Embodiment

[Personal Computer]

A series of the processing described above may be executed by hardware or by software. In this case, for example, a personal computer like one illustrated in FIG. 22 may be configured.

In FIG. 22, a CPU (Central Processing Unit) 301 of a personal computer 300 executes various types of processing according to a program stored in a ROM (Read Only Memory) 302 or a program loaded on a RAM (Random Access Memory) 303 from a storage unit 313. The RAM 303 appropriately stores data and the like required for the CPU 301 to perform the various types of processing.

The CPU 301, the ROM 302, and the RAM 303 are connected to each other through a bus 304. An input/output interface 310 is also connected to the bus 304.

An input unit 311 made of a keyboard, a mouse, and the like, an output unit 312 made of a display made of a cathode ray tube (CRT), a liquid crystal display (LCD), and the like and a speaker, the storage unit 313 configured of a hard disk and the like, and a communication unit 314 configured from a modem and the like, are connected to the input/output interface 310. The communication unit 314 performs communication processing over a network including the Internet.

A drive 315 is also connected to the input/output interface 310 as necessary, a removable medium 321, such as a magnetic disk, an optical disc, a magneto-optical disc, or a semiconductor memory, is appropriately mounted, and a computer program read out therefrom is installed on the storage unit 313 as necessary.

In a case where the above-described series of processing is executed by software, a program that constitutes the software is installed from the network or from a recording medium.

The recording medium is, for example, as illustrated in FIG. 22, separately from the apparatus main body, configured not only from the removable medium 321 which is distributed to deliver a program to a user and is made of a magnetic disk (including a flexible disk) having a program recorded thereon, an optical disc (including a compact disc read only memory (CD-ROM) and a digital versatile disc (DVD)), a magneto-optical disc (including a mini disc (MD)), a semiconductor memory, or the like, but also from the ROM 302 on which a program to be delivered to a user is recorded in a state of being assembled to the apparatus main body, the hard disk included in the storage unit 313, and the like.

Note that the program executed by the computer may be a program that is processed in time series according to the order described in the specification, or may be a program that is processed in parallel or at a necessary timing, such as upon being called.

In addition, in the specification, the steps that describe the program recorded on a recording medium include not only processing performed in time series according to the described order, but also processing that are not necessarily performed in time series but performed in parallel or individually performed.

In addition, in the specification, the system represents the entire apparatus configured from a plurality of devices.

In addition, in the above description, the configuration described as a single device (or as a processing unit) may be divided into a plurality of devices (or processing units) and configured from these devices or the units. Contrary to this, the configuration described as a plurality of devices (or processing units) in the above description may be gathered and configured as a single device (or processing unit). In addition, configurations other than the above-described configuration may also be added to the configurations of the devices (or the processing units). Moreover, when the configuration or the operation of the entire system is substantially the same, a part of the configuration of a certain device (or a processing unit) may be included in the configuration of another device (or another processing unit). That is, the present technology is not limited by the above-described embodiments, and various modifications can be made within a scope without departing from the gist of the present technology.

Note that the present technology may employ the following configurations.

(1) A display control apparatus including:
a first display control unit configured to perform display control of a cell image with one or a plurality of images including cells; and
a second display control unit configured to perform display control such that a part or all of a motion amount generated for each of subregions with the one or the plurality of images is associated with each of the subregions, and is superimposed on the cell image and displayed.

(2) The display control apparatus according to (1), wherein
the cells are cells passively or actively moving, and
the second display control unit displays a part or all of the motion amount to express a state of propagation of a motion of the cells.

(3) The display control apparatus according to (2), wherein the second display control unit displays the state of propagation of a motion of the cells as a time-dependent change of a distribution of the motion amount in the cell image.

(4) The display control apparatus according to (3), wherein the second display control unit expresses the time-dependent change of a distribution of the motion amount by displaying, for each of a plurality of times of day, a two-dimensional map on a curved surface or on a plane, the two-dimensional map expressing the distribution of the motion amount.

(5) The display control apparatus according to (4), wherein the second display control unit expresses a position of the motion amount in the cell image as a position on the two-dimensional map, and expresses an absolute value of the motion amount in color, density, or pattern.

(6) The display control apparatus according to any of (1) to (5), wherein
the cell image is a moving image, and
the second display control unit superimposes, on each of frame images of the cell image, apart or all of the motion amount corresponding to the frame image, and displays a superimposed image.

(7) The display control apparatus according to any of (1) to (6), wherein the second display control unit displays an evaluation result of a distribution of the motion amount along with the motion amount.

(8) A display control method of a display control apparatus, the method including the steps of:
performing display control of a cell image with one or a plurality of images including cells by a first display control unit; and
performing display control by a second display control unit such that a part or all of a motion amount generated for each of subregions with the one or the plurality of images is associated with each of the subregions, and are superimposed on the cell image and displayed.

(9) A program causing a computer to function as:
a first display control unit configured to perform display control of a cell image with one or a plurality of images including cells;
a second display control unit configured to perform display control such that a part or all of a motion amount generated for each of subregions with the one or the plurality of images is associated with each of the subregions, and are superimposed on the cell image and displayed.

(10) An image processing apparatus including:

a motion amount generation unit configured to generate a motion amount of one or a plurality of images including cells for each subregion; and an evaluation unit configured to evaluate a state of propagation of a motion of the cells using a part or all of the motion amount generated by the motion amount generation unit.

(11) The image processing apparatus according to (10), wherein the evaluation unit displays, as an image, a comparison result of the state of propagation of a motion of the cells indicated by the motion amount with a case where it is certain that the motion of the cells is normal.

(12) The image processing apparatus according to (10) or (11), wherein the evaluation unit quantitatively evaluates a change of the state of propagation of a motion of the cells by obtaining a difference of the motion amount of the cell image with the case where it is certain that the motion of the cells is normal, and by evaluating the difference.

(13) The image processing apparatus according to (12), wherein the evaluation unit evaluates a change of a motionless region that does not have a motion in the cell image.

(14) The image processing apparatus according to (12) or (13), wherein the evaluation unit evaluates a change of a speed of displacement of a region where the motion amount is large.

(15) The image processing apparatus according to any of (12) to (14), wherein the evaluation unit evaluates a change of a locus of a center of gravity of the motion amount.

(16) The image processing apparatus according to any of (12) to (15), wherein the evaluation unit evaluates a histogram regarding a speed and a direction of a motion of the cell image.

(17) The image processing apparatus according to any of (10) to (16), wherein the evaluation unit evaluates the state of propagation of a motion of the cells during an observation period of a few hours to a few days.

(18) The image processing apparatus according to any of (10) to (17), wherein the evaluation unit evaluates the state of propagation of a motion of the cells so as to detect occurrence of an irregular pulse of cardiomyocytes regardless of occurrence of QT prolongation that is prolongation of time between Q wave and T wave of the cardiomyocytes.

(19) An image processing method of an image processing apparatus, the method including the steps of:

generating a motion amount of one or a plurality of images including cells for each subregion by a motion amount generation unit; and evaluating a state of propagation of a motion of the cells by an evaluation unit using a part or all of the generated motion amount.

(20) A program causing a computer to function as:

a motion amount generation unit configured to generate a motion amount of one or a plurality of images including cells for each subregion; and an evaluation unit configured to evaluate a state of propagation of a motion of the cells using a part or all of the motion amount generated by the motion amount generation unit.

REFERENCE SIGNS LIST

100 Drug evaluation apparatus
101 Imaging unit
102 Object to be evaluated image data generation/record unit
103 Evaluation index data generation unit
104 Evaluation unit
121 Motion detection unit
122 Motion amount absolute value calculation unit
123 Motion amount absolute value storage unit
141 Frame memory
142 Motion vector calculation unit
201 Motion amount absolute value acquisition unit
202 Mapping unit
203 Time-dependent change analysis unit
204 Motion evaluation unit
205 Display unit
206 Output unit

The invention claimed is:

1. A cardiomyocyte evaluation system comprising:

an imager configured to obtain image data of cardiomyocytes; and at least one non-transitory computer-readable storage medium having stored thereon instructions which, when executed by a processor, implement a method comprising:

detecting, for individual subregions of a plurality of subregions in the image data of cardiomyocytes, motion corresponding to the cardiomyocytes before and after drug administration;

determining, based on the detected motion, a motion direction for each of one or more subregions of the plurality of subregions; and controlling display of one or more graphs indicating frequency of at least one angle determined based on the motion direction for each of the one or more subregions in the image data, wherein the one or more graphs provide an evaluation of a state of the cardiomyocytes before and after drug administration.

2. The cardiomyocyte evaluation system of claim 1, wherein the evaluation of the state of the cardiomyocytes includes a state of propagation of pulsation of the cardiomyocytes.

3. The cardiomyocyte evaluation system of claim 1, wherein the one or more graphs further provide an evaluation of toxicity of a drug on the cardiomyocytes.

4. The cardiomyocyte evaluation system of claim 1, wherein the method further comprises evaluating a change of the frequency of the at least one angle before drug administration and the frequency of the at least one angle after drug administration, and outputting a result of evaluating the change.

5. The cardiomyocyte evaluation system of claim 1, wherein the one or more graphs further provide an evaluation of a change in the state of the cardiomyocytes based on the drug administration.

6. The cardiomyocyte evaluation system of claim 1, wherein the method further comprises:

determining, based on the detected motion, a set of motion speeds for one or more subregions of the plurality of subregions; and controlling display of a graph indicating a distribution of motion speed for the plurality of subregions representing the set of motion speeds.

7. A cardiomyocyte evaluation method comprising:

detecting, for individual subregions of a plurality of subregions in image data of cardiomyocytes, motion corresponding to the cardiomyocytes before and after drug administration;

determining, based on the detected motion, a motion direction for each of one or more subregions of the plurality of subregions; and controlling display of one or more graphs indicating frequency of at least one angle determined based on the motion direction for each of the one or more subregions in the image data, wherein the one or more graphs provide an evaluation of a state of the cardiomyocytes before and after drug administration.

8. The cardiomyocyte evaluation method of claim 7, wherein the one or more graphs further provide an evaluation of toxicity of the drug on the cardiomyocytes.

9. A non-transitory computer-readable storage medium having stored thereon instructions which, when executed by a processor, implement a method comprising:

detecting, for individual subregions of a plurality of subregions in image data of cardiomyocytes, motion corresponding to the cardiomyocytes before and after drug administration;

determining, based on the detected motion, a motion direction for each of one or more subregions of the plurality of subregions; and controlling display of one or more graphs indicating frequency of at least one angle determined based on the motion direction for each of the one or more subregions in the image data, wherein the one or more graphs provide an evaluation of a state of the cardiomyocytes before and after drug administration.

10. The non-transitory computer-readable storage medium of claim 9, wherein the evaluation of the state of the cardiomyocytes includes a state of propagation of pulsation of the cardiomyocytes.

11. The non-transitory computer-readable storage medium of claim 9, wherein the one or more graphs further provide an evaluation of toxicity of the drug on the cardiomyocytes.

* * * * *